(12) United States Patent
Ojima et al.

(10) Patent No.: US 8,149,354 B2
(45) Date of Patent: Apr. 3, 2012

(54) LIQUID CRYSTAL DISPLAY DEVICE

(75) Inventors: Kentaro Ojima, Hitachi (JP); Daisuke Kajita, Hitachi (JP); Ikuo Hiyama, Hitachinaka (JP); Masahiro Ishii, Chiba (JP); Yasushi Tomioka, Hitachinaka (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 195 days.

(21) Appl. No.: 12/768,934

(22) Filed: Apr. 28, 2010

(65) Prior Publication Data
US 2010/0271575 A1    Oct. 28, 2010

(30) Foreign Application Priority Data
Apr. 28, 2009    (JP) .................................. 2009-109965

(51) Int. Cl.
  G02F 1/1335    (2006.01)
  G02F 1/13363    (2006.01)
(52) U.S. Cl. .......... 349/96; 349/118; 349/117; 349/139; 349/143
(58) Field of Classification Search .................. 349/115, 349/116, 117, 118, 119, 96, 104, 106, 139, 349/143
See application file for complete search history.

(56) References Cited

U.S. PATENT DOCUMENTS

| | | | |
|---|---|---|---|
| 4,345,249 A | 8/1982 | Togashi | |
| 6,115,095 A | 9/2000 | Suzuki et al. | |
| 6,285,430 B1 | 9/2001 | Saito | |
| 8,031,309 B2 * | 10/2011 | Ichihashi | 349/119 |
| 2003/0098939 A1 | 5/2003 | Min et al. | |
| 2005/0206817 A1 | 9/2005 | Kajita et al. | |
| 2006/0176424 A1 | 8/2006 | Kajita et al. | |
| 2007/0159581 A1 * | 7/2007 | Moriya | 349/117 |
| 2007/0177085 A1 * | 8/2007 | Nishiyama et al. | 349/117 |
| 2008/0013019 A1 | 1/2008 | Sugiyama | |
| 2008/0180611 A1 | 7/2008 | Minato et al. | |
| 2008/0309858 A1 | 12/2008 | Ojima et al. | |
| 2009/0135346 A1 | 5/2009 | Kajita et al. | |
| 2009/0268133 A1 | 10/2009 | Yoshimi et al. | |
| 2010/0271575 A1 * | 10/2010 | Ojima et al. | 349/96 |

FOREIGN PATENT DOCUMENTS

| | | |
|---|---|---|
| JP | 56-91277 | 7/1981 |
| JP | 09-080424 | 3/1997 |
| JP | 2982869 | 11/1999 |
| JP | 2001-56476 | 2/2001 |
| JP | 2001-242460 | 9/2001 |

(Continued)

*Primary Examiner* — Brian Healy
(74) *Attorney, Agent, or Firm* — Antonelli, Terry, Stout & Kraus, LLP.

(57) ABSTRACT

Provided is a liquid crystal display device including: a substrate (13) including a polarizing layer (11) on a light-input side; a substrate (14) including a polarizing layer (12) on another side, the polarizing layers having absorption axes substantially perpendicular; a liquid crystal layer (15) in which a liquid-crystal-molecule is aligned to be substantially horizontal to the substrates. In a case where an absorption axis of the polarizing layer (11) and an optical axis of the liquid crystal layer are substantially perpendicular, the optical compensating members (17 and 18) may be provided between the polarizing layer (11) and the liquid crystal layer; the absorption axis of the polarizing layer (11) and a slow axis of the optical compensating members are substantially perpendicular; each pixel satisfies nx≈ny≠nz; thickness-direction retardation for pixels of one color is different from other colors; and the thickness-direction retardation for red pixels is larger than 0 nm.

18 Claims, 29 Drawing Sheets

FOREIGN PATENT DOCUMENTS

| | | |
|---|---|---|
| JP | 3204182 | 9/2001 |
| JP | 2001-290149 | 10/2001 |
| JP | 2001-350022 | 12/2001 |
| JP | 2005-003733 | 1/2005 |
| JP | 2005-208356 | 8/2005 |
| JP | 2008-242041 | 10/2008 |

* cited by examiner

LIQUID CRYSTAL DISPLAY DEVICE

CROSS-REFERENCE TO RELATED APPLICATION

The present application claims priority from Japanese application JP 2009-109965 filed on Apr. 28, 2009, the content of which is hereby incorporated by reference into this application.

BACKGROUND OF THE INVENTION

1. Field of the Invention

The present invention relates to a liquid crystal display, and more particularly, to an in-plane switching (IPS) mode liquid crystal display device in which liquid crystal molecules are homogeneously aligned during black display, and an electrical field is applied to the molecules in a lateral direction, to thereby control light transmittance and blockage, and to improving the viewing-angle characteristics (particularly for black display and low gradation display) of such a device.

2. Description of the Related Art

As systems in which the direction of the electrical field applied to the liquid crystal is made parallel to the substrates (hereinafter, referred to as lateral electrical-field systems or IPS mode), systems employing a comb-tooth electrode provided on one substrate have been proposed in Japanese Patent Application Laid-open. Publication. No Sho 56-91277, Japanese Patent Application Laid-open No. Hei 9-80424, and Japanese Patent Application Laid-open No. 2001-056476. According to those systems, it has been known that the liquid crystal molecules primarily rotate in a plane horizontal to the substrate, and hence the difference in the degree of birefringence when viewed obliquely between periods when an electrical field is applied and periods when an electrical field is not applied is small, and the viewing angle is wide.

However, although changes in birefringence of the liquid crystal itself are small in the IPS mode, it has been known that, due to the characteristics of polarizers, light leakage occurs when viewed from an oblique direction aligned away from the absorption axis of the polarizers. A system which uses a retardation film in order to stop such light leakage of polarizers in the oblique direction is disclosed in Japanese Patent Application Laid-open No. 2001-350022. However, the publication basically aims to improve the viewing angle of the polarizers alone. The effect of the liquid crystal is considered for a vertical alignment (VA) mode, but a system for compensating for the effect of the liquid crystal layer in the IPS mode is not disclosed in the publication in any way.

Japanese Patent No. 3204182 discloses means for suppressing the occurrence of changes in white color depending on the viewing direction. However, there is no suggestion of the improvement of black display characteristics.

Meanwhile, disclosed in Japanese Patent No. 2982869 is a configuration in which a retardation film is positioned to the inside of one of the polarizers in order to improve the viewing-angle characteristics of black display. In this system, the effect of triacetylcellulose (TAC) forming supporting-substrate materials positioned on both sides of the polarizers is considered. However, the investigations of the inventors of the present invention revealed that phase compensation with one retardation film in only one polarizer does not provide sufficiently deep black display at oblique viewing angles, nor reduce coloring due to wavelength dispersion of the liquid crystal layer. Moreover, there is no disclosure of the difference in phase compensation which depends on whether the alignment axis (slow axis) of liquid crystal molecules during black display is parallel or perpendicular to the absorption axis of the polarizer on the input side. In the related art mentioned above, the viewing-angle characteristics are discussed only in the context of brightness characteristics, and changes in color are not addressed at all.

Further, Japanese Patent Application Laid-open No. 2005-208356 discloses a configuration in which a supporting-substrate material of one polarizer is substantially optically isotropic and a retardation film is provided in the other polarizer in order to improve a bright spot and coloring of black display at oblique angles. This system may reduce the effect of wavelength dispersion of the liquid crystal layer. However, the investigations of the inventors of the present invention revealed that this system does not reduce coloring due to wavelength dispersion of the retardation film.

Moreover, Japanese Patent Application Laid-open No. 2008-242041 discloses a configuration in which a color filter (CF) with different thickness-direction retardations Rth for colors of red (R), green (G), and blue (B) is provided in order to improve coloring of black display at oblique angles. However, there is no suggestion of the configuration of a retardation film necessary to improve the bright spot of black display at oblique angles. In addition, there is no disclosure of the difference in phase compensation which depends on whether the alignment axis (slow axis) of liquid crystal molecules during black display is parallel or perpendicular to the absorption axis of the polarizer on the input side.

SUMMARY OF THE INVENTION

A bright spot and coloring occur in an oblique direction during black display in in-plane switching (IPS) mode liquid crystal display devices in which liquid crystal molecules are homogeneously aligned during black display, and an electrical field is applied to the molecules in a lateral direction, to thereby control light transmittance and blockage.

The IPS mode liquid crystal display devices use homogeneously aligned liquid crystal molecules and two polarizers disposed with their absorption axes extending substantially perpendicularly in the vertical and horizontal directions with respect to the front surface of the screen. Thus, when the screen is viewed obliquely from one of the vertical and horizontal directions, the absorption axes of the two polarizers are viewed perpendicularly, and the homogeneously aligned liquid crystal molecules and the absorption axis of one of the polarizers are parallel with each other, which sufficiently reduces black brightness. When the screen is viewed obliquely from an azimuth angle of 45°, in contrast, the angle formed by the absorption axes of the two polarizers is offset from 90°. This causes birefringence of transmitted light and hence leakage of light, which prevents a sufficient reduction in black brightness. Further, the amount of light leakage in the oblique direction differs depending on the wavelength to cause coloring. In view of the above, it is an object of the present invention to provide an IPS mode liquid crystal display device in which brightness increase and coloring in the oblique direction during black display are both reduced in order to provide favorable black display in an IPS mode when viewed from any azimuth angle. The foregoing and other objects and novel features of the present invention become apparent from the description herein and the accompanying drawings.

In order to solve the above-mentioned problems, the present invention provides a liquid crystal display device including: a first substrate including a first polarizing layer on a light-input side; a second substrate including a second polarizing layer on another side, the first polarizing layer and the second polarizing layer having absorption axes substantially perpendicular to each other; a liquid crystal layer in which a liquid crystal molecule is aligned so as to be substantially horizontal to the first substrate and the second substrate; a matrix-drive electrode group having a pair of electrodes provided in each pixel on a side closer to the liquid crystal layer of one of the first substrate and the second substrate; a rear-surface illuminating device; at least one optical compensating member; and a color filter layer provided between the first substrate and the second substrate, in which: in a case where an absorption axis of the first polarizing layer and an optical axis of the liquid crystal layer are substantially perpendicular to each other, the at least one optical compensating member is provided between the first polarizing layer and the liquid crystal layer, and a refractive index between the second polarizing layer and the liquid crystal layer is substantially isotropic; in a case where the absorption axis of the first polarizing layer and the optical axis of the liquid crystal layer are substantially parallel to each other, the at least one optical compensating member is provided between the second polarizing layer and the liquid crystal layer, and a refractive index between the first polarizing layer and the liquid crystal layer is substantially isotropic; the absorption axis of the first polarizing layer and a slow axis of the at least one optical compensating member are substantially perpendicular to each other; the color filter layer satisfies nx≈ny≠nz; at least one of thickness-direction retardations Rth(R), Rth(G), and Rth(B) for red (R) pixels, green (G) pixels, and blue (B) pixels is different from the thickness-direction retardations for the other pixels; and Rth(R) for the red (R) pixels satisfies Rth(R)>0 nm.

A detailed description is made below in conjunction with an embodiment of present invention.

According to the liquid crystal display device of the present invention, by prescribing configurations including polarizers, a liquid crystal layer, a color filter (CF), and an optical compensating member and respective optical constants of the optical members, it is possible to reduce the effect of the liquid crystal layer and the optical compensating member in oblique viewing angles, and to reduce black brightness and coloring in the oblique direction.

DETAILED DESCRIPTION OF THE INVENTION

A liquid crystal display device according to an embodiment of the present invention is specifically described below.

As liquid crystal televisions come into prominence, an important consideration is the question of how a non-self-light-emitting liquid crystal display transmits light from an illuminating device during white display and blocks light during black display. This embodiment relates to a liquid crystal display device which can reduce brightness when viewed from an oblique direction during black display while simultaneously eliminating coloring.

Figure 3:
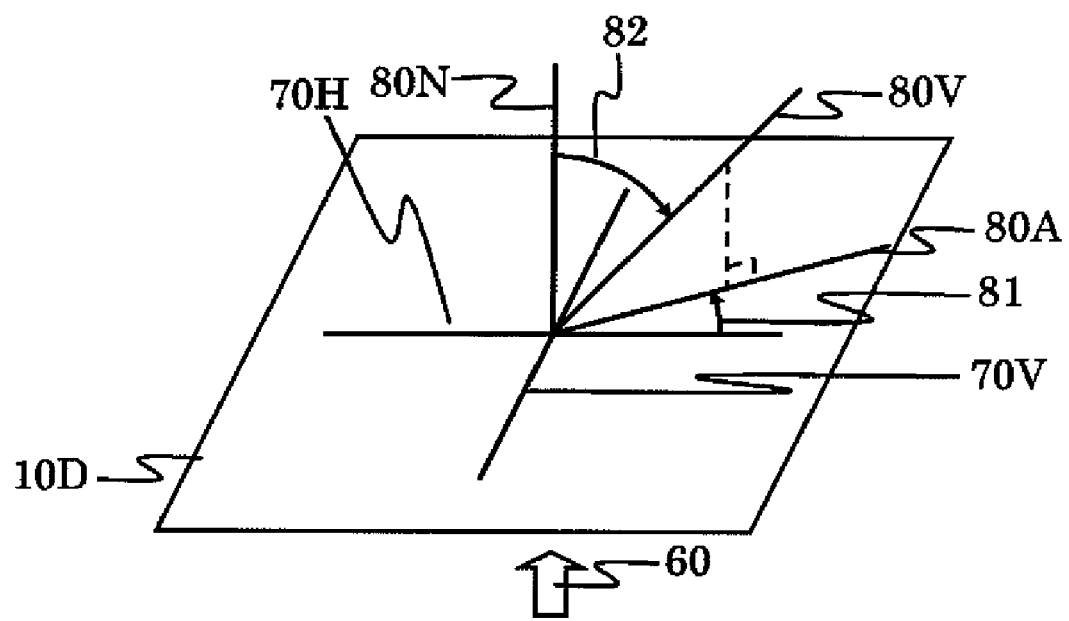
FIG. 3 is a definition diagram for illustrating an example of the liquid crystal display device of the present invention.

First, before considering the reasons for brightness increase and coloring in the oblique direction during black display, the definitions of symbols are given using FIG. 3. Light 60 enters from an illuminating device and is modulated by a liquid crystal element, and the light exits via a display surface 10D. In this case, SON represents the normal direction to the display surface 10D, 70H represents the horizontal direction, 70V represents the vertical direction, 80A represents the projection of a viewing direction 80V on the display surface 10D, φ represents an azimuth angle 81 θ formed by the horizontal direction 70H and the projection 80A, and represents a polar angle 82 formed by the normal direction 80N and the viewing direction 80V.

Figure 4A:
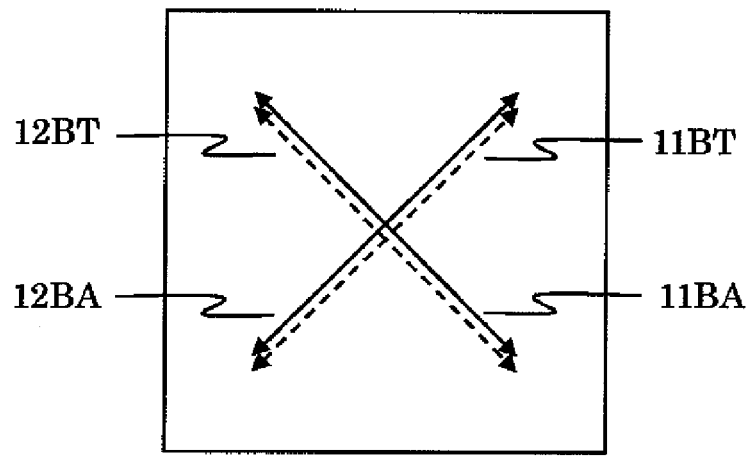
FIGS. 4A and 4B are conceptual diagrams for illustrating an example of the liquid crystal display device of the present invention.
Figure 4B:
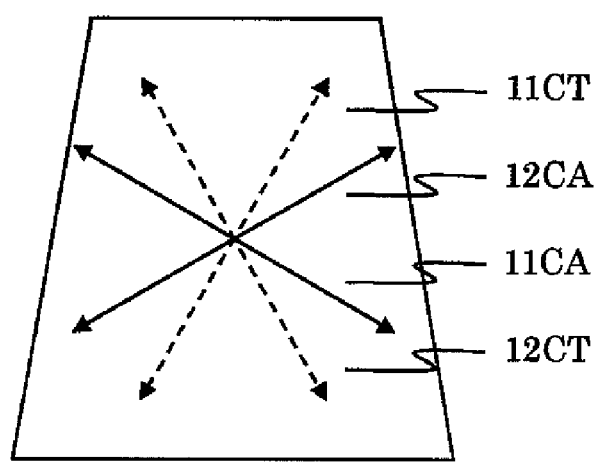

Next, the reasons for light leakage in the pair of orthogonal polarizers are considered for the polar angle θ and the azimuth angle φ in the case of θ≠0° and φ≠0° and 180°±90°. When absorption axes 11BA and 12BA (or transmission axes 11BT and 12BT) of the two polarizers are orthogonal, as illustrated in FIG. 4A, the light input from the normal direction of the polarizers becomes linearly polarized by the polarizer on the light-input side and is absorbed by the polarizer on the light-output side, allowing black display. On the other hand, on viewing from an oblique direction (θ≠0°, φ≠0°, 180°±90°), as illustrated in FIG. 4B, a component parallel to the transmission axis of the polarizer on the opposite side is present, the light is not completely blocked by the polarizer on the opposite side, and light leakage occurs. Further, the investigations of the inventors of the present invention have revealed that, when a parallel aligned liquid crystal layer is positioned between the orthogonal polarizers, the effect of the liquid crystal layer is not evident if the optical axis of the liquid crystal layer is parallel to the absorption axis of the input polarizer. In addition, the investigations have revealed that the effect of the liquid crystal layer is evident when the optical axis of the liquid crystal layer is offset, or when the two polarizers are offset from orthogonality.

The use of a Poincare-sphere display makes those polarization states very readily understood. Poincare-sphere displays are disclosed in Chapter 5, pages. 102 to 163 of "Crystal Optics" ("Kesshou Kougaku"), 1984 First Edition, Fourth Printing, edited by the Japan Society of Applied Physics, Optics Association, and published by Morikita Publishing Co., Ltd. When the plane perpendicular to the direction of travel of light is defined by the x and y axes, the amplitudes of the electrical fields along those axes are Ex and Ey, respectively, and the relative phase difference between Ex and Ey is δ (=δy−δx), the Stokes parameters S0, S1, S2, and S3 are expressed by the following Expression (1).

[Expression 1]

$$S0=<|Ex|^2>+<|Ey|^2>$$

$$S1=<|Ex|^2>-<|Ey|^2>$$

$$S2=<2ExEy \cos \delta>$$

$$S5=<2ExEy \sin \delta> \quad (1)$$

Figure 5:
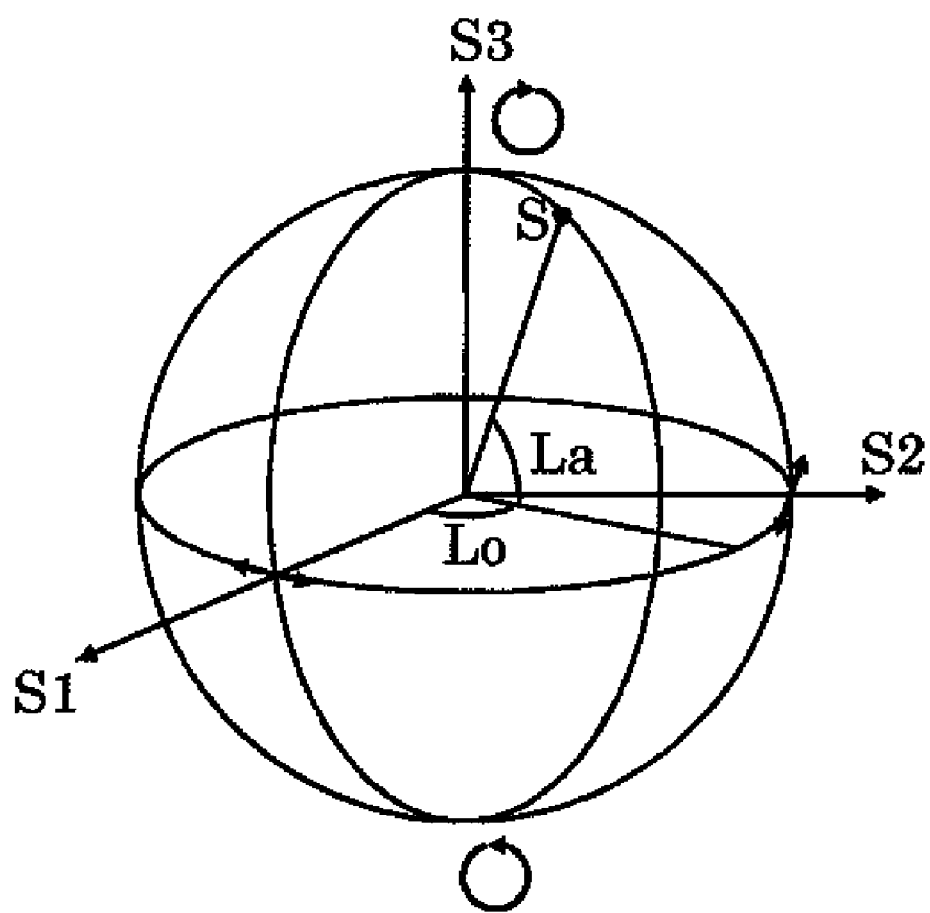
FIG. 5 is a general Poincare-sphere display for illustrating an example of the liquid crystal display device of the present invention.

In the case of complete polarization, $S0^2=S1^2+S2^2+S3^2$. In addition, FIG. 5 illustrates the result of representing this state on a Poincare sphere. In other words, the S1, S2, and S3 axes are on the axes of the spatial orthogonal coordinate system, and the S point that represents the polarization state is positioned on the surface of a sphere having a radius of the intensity S0. $S0^2=S1^2+S2^2+S3^2$ is satisfied in the case of complete polarization, and therefore, when considering the point at a polarization state S on a sphere having a radius of 1, and using a latitude La and a longitude Lo, the following Expression (2) is satisfied.

[Expression 2]

$$S1=\cos La \cos Lo$$

$$S2=\cos La \sin Lo$$

$$S3=\cos La \quad (2)$$

On the Poincare sphere here, the upper hemisphere is rightward polarization, the lower hemisphere is leftward polarization, the equator is linear polarization, and the upper and lower poles are right circular polarization and left circular polarization, respectively.

Figure 6A:
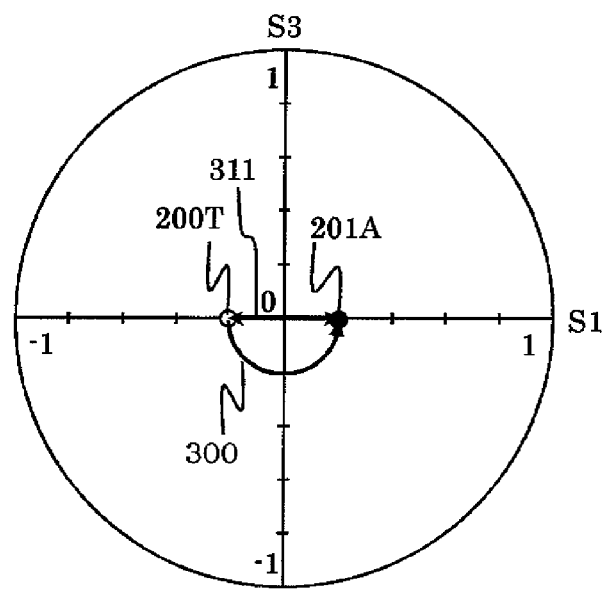
FIGS. 6A and 6B are Poincare-sphere display for illustrating an example of the liquid crystal display device of the present invention.
Figure 6B:
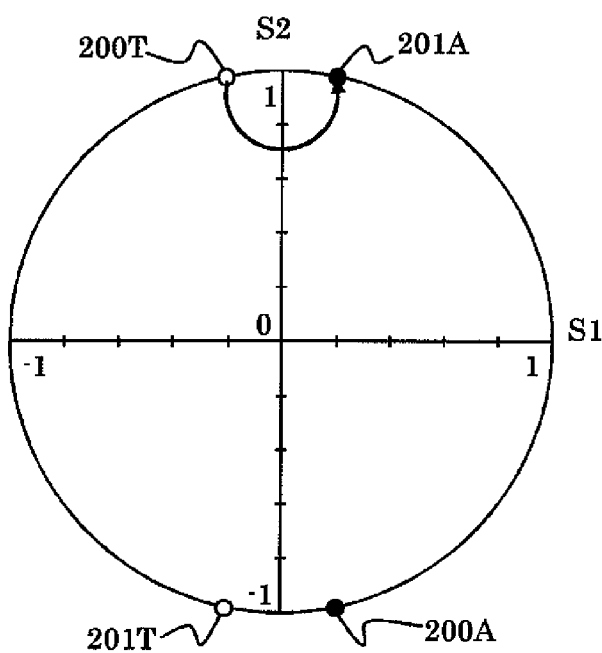

The results considering the state of FIG. 4B as a Poincare sphere are illustrated in FIGS. 6A and 6B. Here, FIGS. 6A and 6B illustrate a case of viewing from an azimuth angle φ=45° and θ=60°, in which FIG. 6A illustrates the projection on the S1-S3 plane, and FIG. 6B illustrates the projection on the S1-S2 plane. The polarization state of the polarization transmission axis 11BT on the light-input side is 200T, the linearly polarized light containing a polarization component in the absorption axis 11BA is 200A, the polarization state of the polarization transmission axis 12BT on the light-output side is 201T, and the linearly polarized light containing a polarization component in the absorption axis 12BA is 201A. In other words, a distance 311 between 200T and 201A corresponds to the light leakage. It can therefore be understood that light leakage can be eliminated by performing a transformation 300 on the polarization state of 200T to the polarization state of 201A.

An idealized state of the polarizing layer alone is considered in FIGS. 6A and 6B, but in a standard polarizer, supporting-substrate materials are positioned on both sides of the polarizing layer. Those supporting-substrate materials are usually formed of triacetyl cellulose (TAC). TAC has a birefringence. Thus, when light enters from an oblique direction and then exits, the polarization state of the light is changed. On a Poincare sphere, changes in polarization state caused by a birefringence medium are represented by rotation by a specific angle based on an inclination retardation representing birefringence in an oblique direction determined by values of properties of the birefringence medium (refractive index and thickness) and values related to the input light (azimuth angle and viewing angle) about a specific axis determined by the values related to the input light (azimuth angle and viewing angle).

Figure 7:
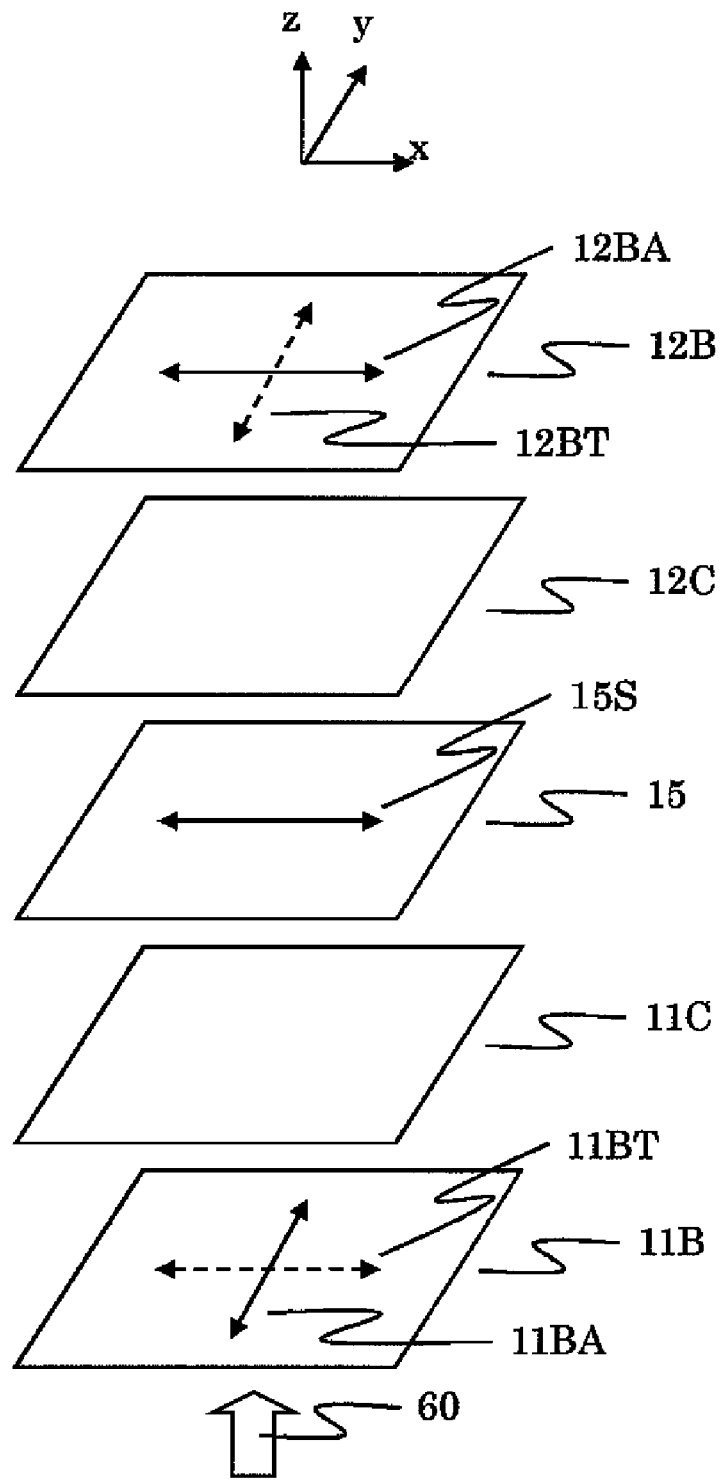
FIG. 7 is a configuration diagram for illustrating an example of the liquid crystal display device of the present invention.

Thus, no effect on the polarization state is evident for perpendicular input, but the effect of the supporting-substrate material is evident during oblique input, and hence the polarization state changes. The changes in the polarization state in the optically layered configuration illustrated in FIG. 7 are now considered. The polarizers 11 and 12 are positioned on both sides of a liquid crystal layer 15. A supporting-substrate material 11C and a supporting-substrate material 12C are positioned on the inside of the input polarizer 11 and the output polarizer 12, respectively. An optical axis 15S of the liquid crystal layer is positioned perpendicular to the absorption axis 11BA of the input polarizer 11, parallel to the transmission axis 11BT thereof, parallel to the absorption axis 12BA of the output polarizer 12, and perpendicular to the transmission axis 12BT thereof in this case. This state is called e-mode. When the axes of the upper and lower polarizers are rotated 90°, i.e., when the optical axis 15S of the liquid crystal layer is positioned parallel to the absorption axis 11BA of the input polarizer 11, perpendicular to the transmission axis 11BT thereof, perpendicular to the absorption axis 12BA of the output polarizer 12, and parallel to the transmission axis 12BT thereof, the state is referred to as o-mode. In addition, supporting-substrate materials 11A and 12A are usually positioned on the outside of polarizing layers 11B and 12B as illustrated in FIG. 1, but are omitted here, because those materials are not necessary for considering the polarization state.

Figure 8A:
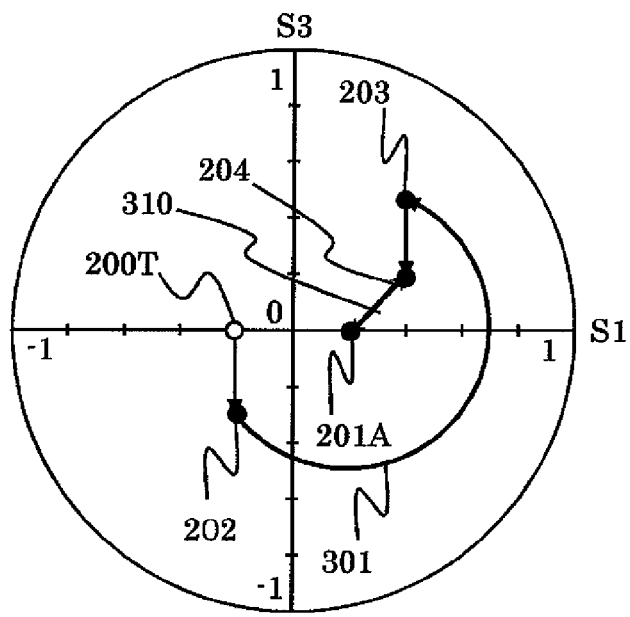
FIGS. 8A and 8B are Poincare-sphere displays for illustrating an example of the liquid crystal display device of the present invention.

Changes in the polarization state of the configuration of FIG. 7 are considered on a Poincare sphere using FIG. 8A. Unless otherwise stated, the values of the various properties below are assumed to be values for light having a wavelength of 550 nm. When considering light viewed from an azimuth angle $\phi=45°$ and a viewing angle $\theta=60°$ as in FIGS. 6A and 6B, the polarization state of the light transmitted through the transmission axis 11BT of the polarizing layer 11B is 200T, and a transformation is made to achieve a polarization state 202 by the supporting-substrate material 11C. Further, due to the liquid crystal layer 15, a transformation 301 is made to achieve a polarization state 203. Further, due to the supporting-substrate material 12C of the output polarizer 12, a transformation is made to achieve a polarization state 204. Here, the polarization state that is aligned with the absorption axis 12BA of the output polarizing layer 12B is 201A, and light leaks by an amount of a distance 310 between the polarization states 204 and 201A.

Figure 8B:
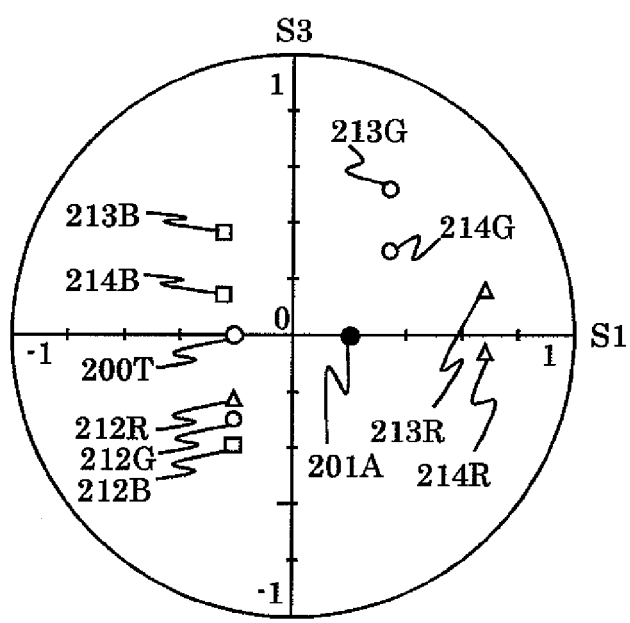

While 550-nm light is considered in FIG. 8A, FIG. 8B illustrate changes in polarization state for the visible-light spectrum (B: 450 nm, G: 550 nm, and R: 620 nm) in the configuration of FIG. 7. The above-mentioned visible-light wavelengths are selected in order to consider changes in polarization state for a general color filter of the three primary colors. When considering light viewed from an azimuth angle $\phi=45°$ and a viewing angle $\theta=60°$ as in FIGS. 6A and 6B, the polarization state of the light transmitted through the transmission axis 11BT is 200T. Due to the supporting-substrate material 11C, a transformation is made into polarization states 212R, 212G, and 212B. Due to the liquid crystal layer 15, a transformation is made into polarization states 213R, 213G, and 213B. Due to the supporting-substrate material 12C of the output polarizer 12, a transformation is made into polarization states 214R, 214G, and 214B. The polarization state that is aligned with the absorption axis 12BA of the output polarizing layer 12B is 201A, and as can be understood from 214R, 214G, 214B, and 201A, the amount of light leakage differs depending on the wavelength. The occurrence of coloring when viewed obliquely can therefore be understood.

Figure 1:
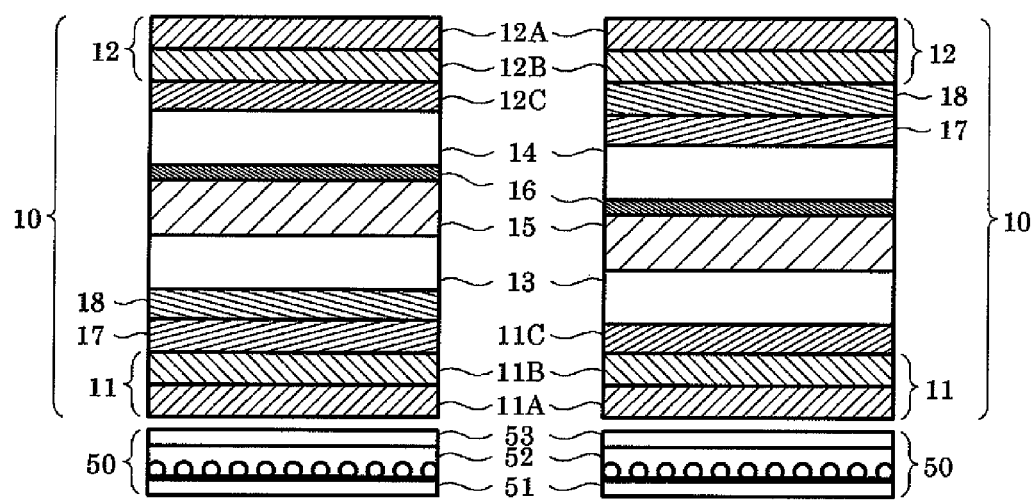
FIG. 1 is a configuration view illustrating an example of a liquid crystal display device of the present invention.

FIG. 1 illustrates the configuration of the liquid crystal display device according to this embodiment. The liquid crystal display device includes: a liquid crystal layer 15 provided with a first substrate 13 including a first polarizing layer 11 on a light-input side and a second substrate 14 including a second polarizing layer 12 on the other side. Respective absorption axes of the first substrate and the second substrate are substantially perpendicular, and liquid crystal molecules are aligned so as to be substantially horizontal to the substrates and substantially perpendicular or substantially parallel to the absorption axis of the first polarizing layer 11. The liquid crystal molecules are caused to rotate in a plane horizontal to the first substrate when an electrical field in a direction parallel to the first substrate is applied. The liquid crystal display device further includes a matrix-drive electrode group having a pair of electrodes provided in each pixel on a side closer to the liquid crystal layer of one of the first substrate and the second substrate, and a rear-surface illuminating device.

The left side of FIG. 1 illustrates a case of e-mode in which the optical axis of the liquid crystal layer 15 is substantially perpendicular to the absorption axis of the polarizing layer 11B. In this case, optical compensating members 17 and 18 are sandwiched between the liquid crystal layer 15 and the polarizing layer 11B to also serve as supporting-substrate materials.

Figure 9:
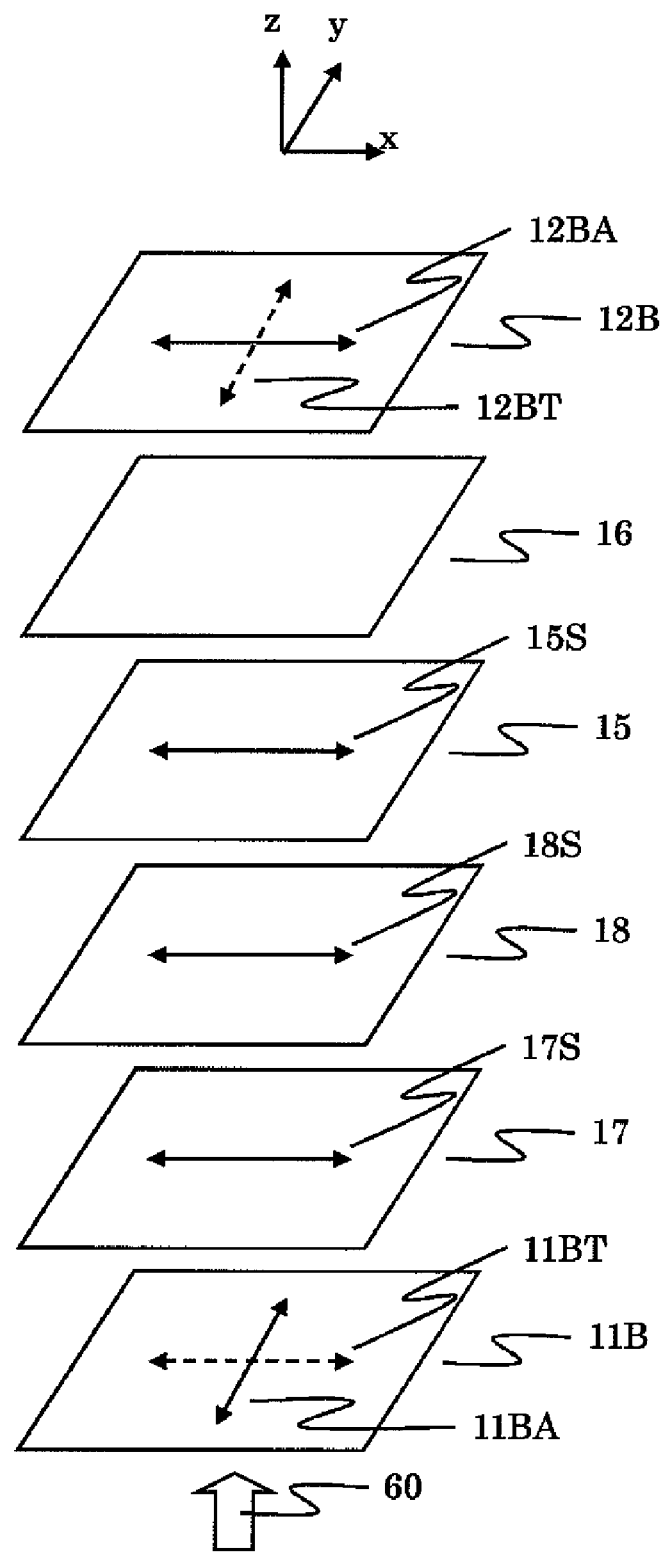
FIG. 9 is a configuration diagram illustrating an example of the liquid crystal display device of the present invention.

While FIG. 1 illustrates the polarizer-supporting substrate materials 11A and 12A and the substrates 13 and 14, those materials may be ignored when the polarization state is considered. FIG. 9 is a diagram that illustrates an optical configuration in which the above-mentioned components are omitted to clearly illustrate the direction of the slow axis, within the plane parallel to the substrate, of each member. The slow axes of the optical compensating members 17 and 18 may be any one of perpendicular and parallel to the absorption axis of the input polarizer, but are perpendicular in the illustration of FIG. 9. An approach for reducing light leakage from the oblique direction using a color filter 16 and the optical compensating members 17 and 18 in the above-mentioned optical configuration is considered.

Figure 10A:
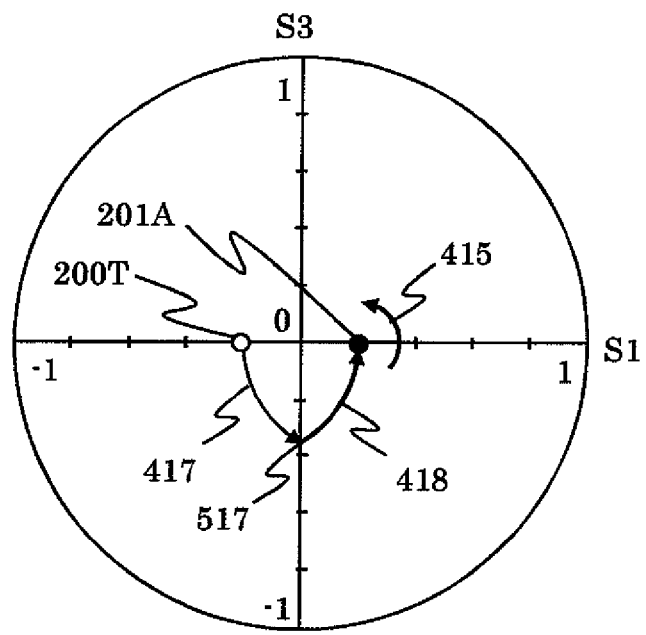
FIGS. 10A and 10B are Poincare-sphere displays for illustrating an example of the liquid crystal display device of the present invention.
Figure 10B:
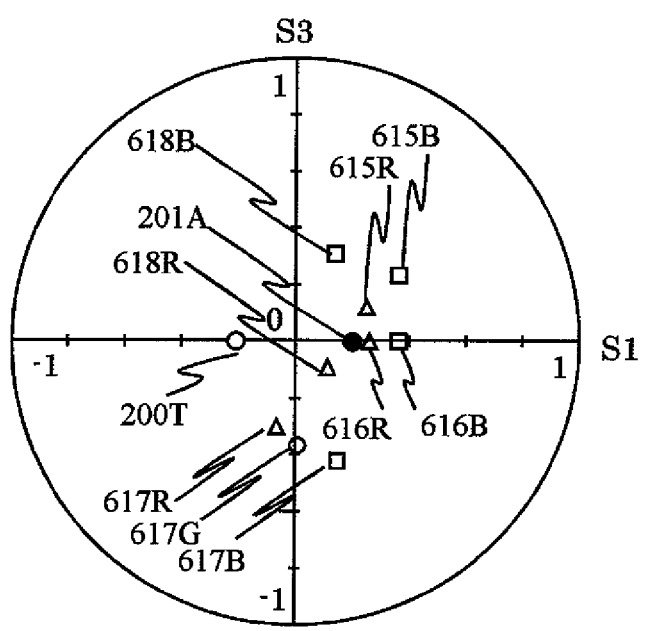

FIGS. 10A and 10B illustrate changes in polarization state using a Poincare sphere. When considering light viewed from an azimuth angle $\phi=45°$ and a viewing angle $\theta=60°$ in FIG. 10A, the polarization state of the light transmitted through the transmission axis 11BT of the polarizing layer 11B is 200T. Due to the optical compensating member 17, a transformation 417 is made into a polarization state 517. Next, due to the optical compensating member 18, a transformation 418 is made into a polarization state 201A. A transformation in polarization state due to the liquid crystal layer 15 is represented by a rotational transformation 415 about 201A. Hence, in the case where the polarization state is 201A, no transformation in polarization state is caused. Thus, in the case where only 550-nm light is considered, the effect of the liquid crystal layer is eliminated, to thereby provide favorable black display.

In contrast, FIG. 10B illustrates changes in polarization state for the visible-light spectrum (B: 450 nm, G: 550 nm, and R: 620 nm). The above-mentioned visible-light wavelengths are selected in order to consider changes in polarization state for a general color filter of the three primary colors. The light transformed by the optical compensating member 17 is dispersed as indicated by polarization states 617R, 617G, and 617B due to the wavelength dispersion characteristics of the optical compensating member 17. After that, the optical compensating member 18 transforms the polarization state 617G into a polarization state 201A, but transforms the polarization states 617R and 617B into polarization states 618R and 618B due to the wavelength dispersion characteristics of the optical compensating member 18. Due to the liquid crystal layer, the polarization states 618R and 618B are further transformed into polarization states 615R and 615B. In this state, as can be understood from the description so far, the amount of light leakage differs for each of the red, green, and blue colors due to the wavelength dispersion characteristics of the optical compensating member, which causes coloring when viewed obliquely. When Rth's of the color filter 16 for each color are controlled independently, the polarization states 615R and 615B are transformed into polarization states 616R and 616B, which makes it possible to suppress coloring at oblique angles compared to a case where Rth's of the color filter 16 are not considered.

Figure 11A:
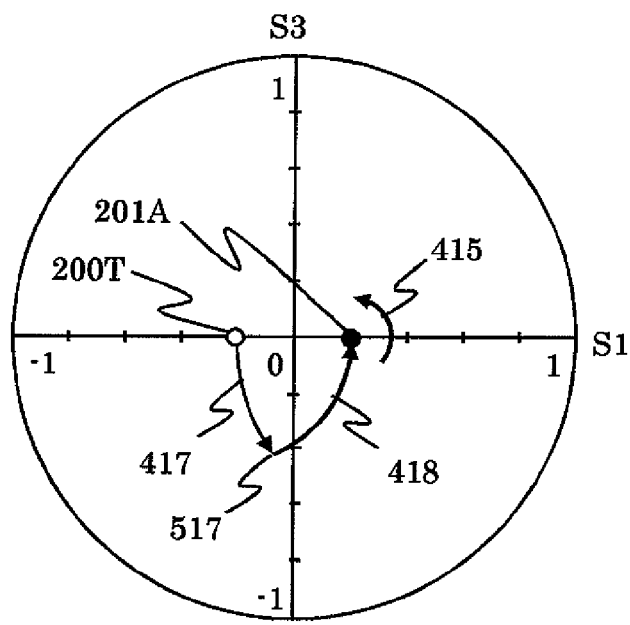
FIGS. 11A and 11B are Poincare-sphere displays for illustrating an example of the liquid crystal display device of the present invention.

In FIG. 10B, Rth(B) for blue pixels of the color filter 16 satisfies Rth(B)>0 nm due to the relationship between the optical compensating members 17 and 18 and the liquid crystal layer 15. Meanwhile, a case where the combination of the optical compensating members 17 and 18 is changed to reduce Re of the liquid crystal layer is considered. When considering light viewed from an azimuth angle φ=45° and a viewing angle θ=60° in FIG. 11A, similarly to the case illustrated in FIG. 10A, in the case where only 550-nm light is considered, the effect of the liquid crystal layer is eliminated, to thereby provide favorable black display.

Figure 11B:
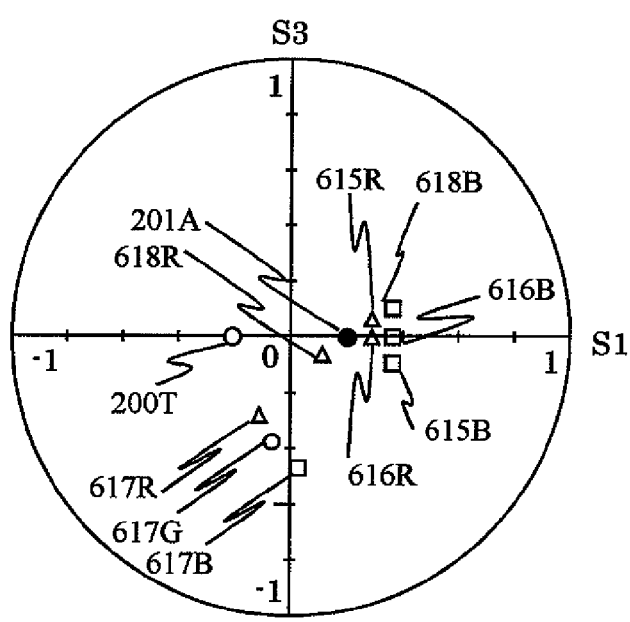

In contrast, FIG. 11B illustrates changes in polarization state for the visible-light spectrum (B: 450 nm, G: 550 nm, and R: 620 nm). The above-mentioned visible-light wavelengths are selected in order to consider changes in polarization state for a general color filter of the three primary colors. The light transformed by the optical compensating member 17 is dispersed as indicated by polarization states 617R, 617G, and 617B due to the wavelength dispersion characteristics of the optical compensating member 17. After that, the optical compensating member 18 transforms the polarization state 617G into the polarization state 201A, but transforms the polarization states 617R and 617B into polarization states 618R and 618B due to the wavelength dispersion characteristics of the optical compensating member 18. Due to the liquid crystal layer, the polarization states 618R and 618B are further transformed into polarization states 615R and 615B. When Rth's of the color filter 16 for each color are controlled independently, the polarization states 615R and 615B are transformed into polarization states 616R and 616B. In this case, Rth(B) for blue pixels of the color filter 16 satisfies Rth(B)<0 nm.

As illustrated in FIGS. 10B and 11B, the polarization state 615R of the red (R) pixel area of the color filter has a positive 53-direction component. Hence, it is necessary that Rth (R) for red pixels should satisfy Expression (3) in order to reduce light leakage in the red color.

[Expression 3]

$$Rth(R) > 0 \text{ nm} \tag{3}$$

As described above, in the case where the absorption axis of the polarizing layer 11B and the slow axes of the optical compensating members 17 and 18 are substantially perpendicular and the optical constant of the optical compensating members 17 and 18 is determined such that light around 550 nm input to the color filter becomes close to the polarization state 201A, the polarization state 615R of the red (R) pixel area tends to have a positive S3-direction component. Thus, it is possible to reduce light leakage in the red color by making Rth(R) for red pixels larger than 0 nm.

Meanwhile, the polarization state 615B of the blue pixel area of the color filter can have a positive or negative S3-direction component depending on the combination of the optical compensating members. However, changes in polarization state of the liquid crystal layer are a rotational transformation 415 about 201A, and hence the radius of the rotational transformation is determined by the combination and the wavelength dispersion characteristics of the optical compensating members, and Rth(B) falls within a range indicated by Expression (4).

[Expression 4]

$$|Rth(B)| \leq 10.1 \, \text{Ln}(|Nz1-0.5| \cdot |Nz2-0.5|) + 33.1 \tag{4}$$

where Nz1 is an Nz coefficient of the optical compensating member 17 which satisfies Nz1≧1, and Nz2 is an Nz coefficient of the optical compensating member 18 which satisfies Nz2≧0.

Figure 12A:
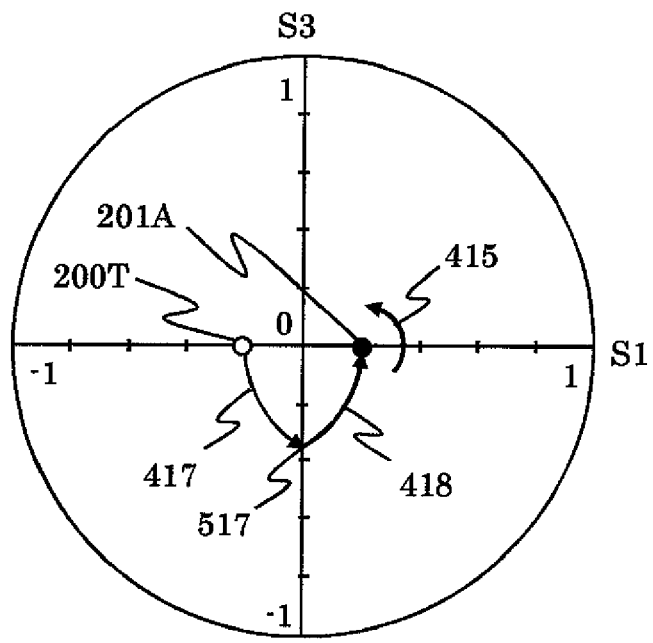
FIGS. 12A and 12B are Poincare-sphere displays for illustrating an example of the liquid crystal display device of the present invention.

An approach for reducing black brightness in the oblique direction and reducing coloring under such conditions has been described so far. In contrast, an approach for significantly reducing coloring in the oblique direction is described with reference to FIGS. 12A and 12B. As can be understood from FIG. 12A, the same configuration as the configuration of FIGS. 10A and 10B is considered.

Figure 12B:
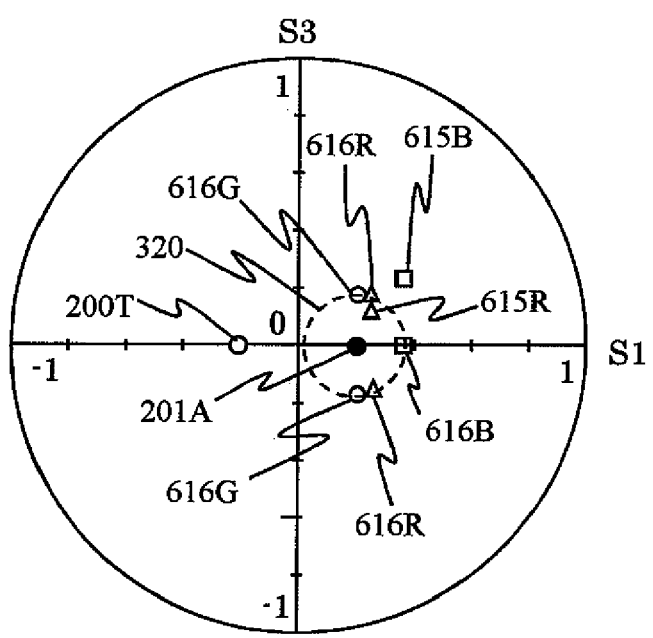

While Rth of the green pixel area of the color filter is close to 0 nm in the illustration of FIG. 10B, Rth's of the red, green, and blue pixel areas of the color filter are adjusted to a positive or negative value such that light leakage in each of the red, green, and blue colors is about the same as each other. In other words, it is possible to make the amount of light leakage uniform, and to significantly reduce coloring, by making the distance between the polarization states 616R, 616G, and 616B and the polarization state 201A substantially the same as each other (on a circle 320) as illustrated in FIG. 12B.

As described above, it is possible to reduce both black brightness and coloring in the oblique direction more than previously by independently controlling Rth's of the color filter in accordance with the wavelength dispersion characteristics of the optical compensating members and the liquid crystal layer. Further, because it is possible to significantly reduce coloring in the oblique direction by independently controlling Rth's of the color filter, the number of choices to be taken can be increased compared to a case where phase compensation is performed only by optical compensating members.

Figure 13:
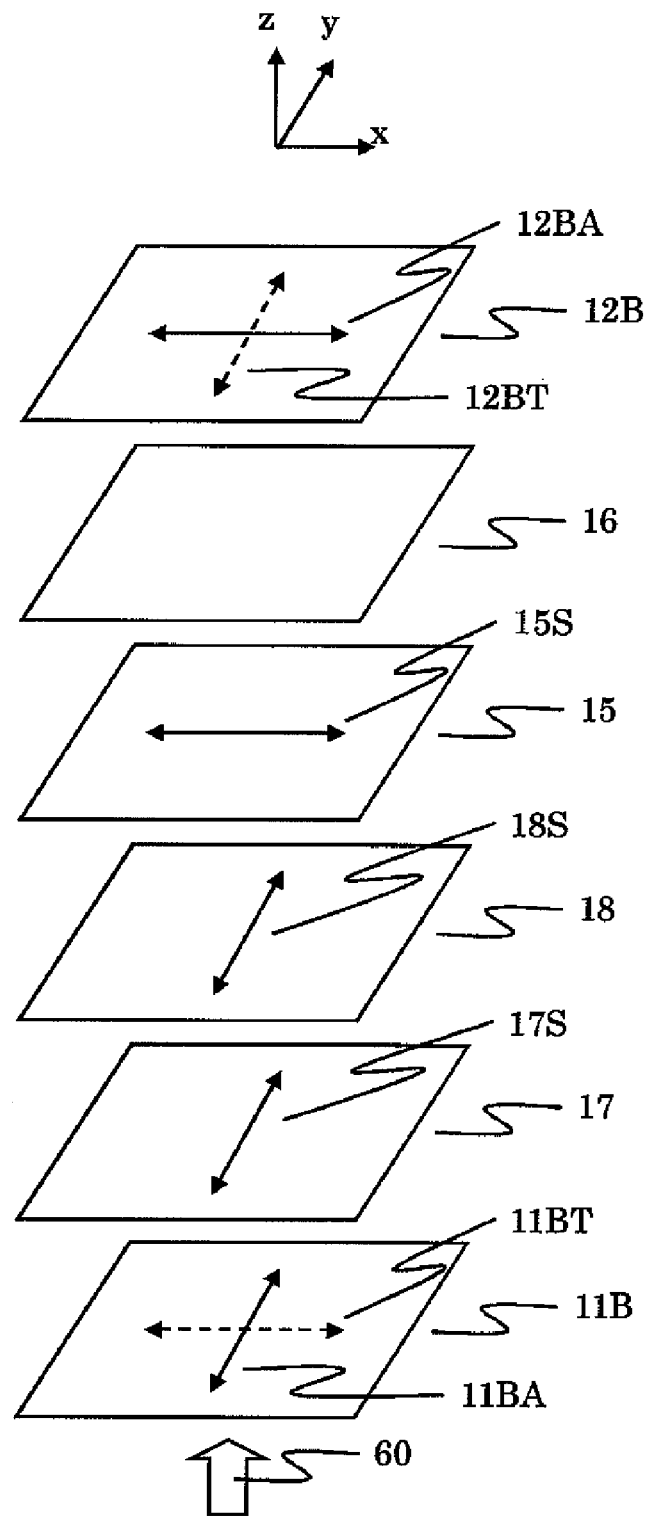
FIG. 13 is a configuration diagram illustrating an example of the liquid crystal display device of the present invention.

Next, a case where the slow axes of the optical compensating members 17 and 18 are parallel to the absorption axis of the input polarizer is considered in the left side of FIG. 1. While FIG. 1 illustrates the polarizer-supporting substrate materials 11A and 12A and the substrates 13 and 14, those may be ignored when the polarization state is considered. FIG. 13 is a diagram that illustrates an optical configuration in which the above-mentioned components are omitted to clearly illustrate the direction of the slow axis, within the plane parallel to the substrate, of each member.

An approach for reducing light leakage from the oblique direction using the color filter 16 and the optical compensating members 17 and 18 in the above-mentioned optical configuration is considered.

Figure 14A:
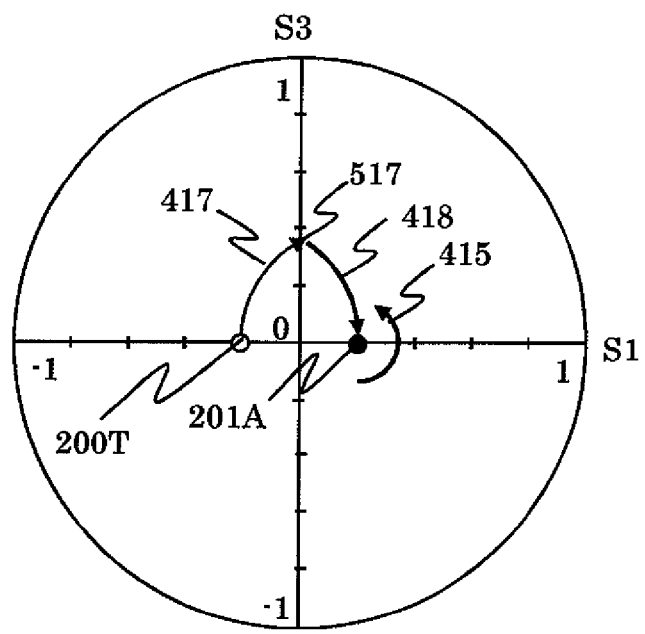
FIGS. 14A and 14B are Poincare-sphere displays for illustrating an example of the liquid crystal display device of the present invention.
Figure 14B:
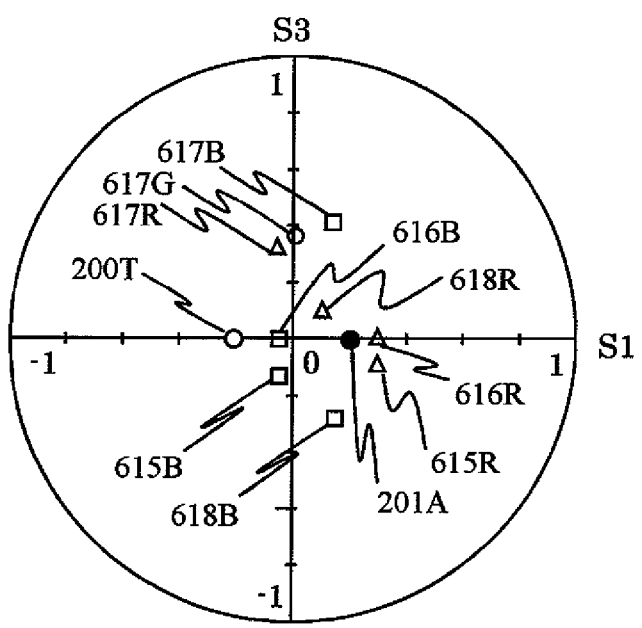

FIGS. 14A and 14B illustrate changes in polarization state using a Poincare sphere. When considering light viewed from an azimuth angle φ=45° and a viewing angle θ=60° in FIG. 14A, the polarization state of the light transmitted through the transmission axis 11BT of the polarizing layer 11B is 200T.

Due to the optical compensating member 17, a transformation 417 is made into a polarization state 517. Next, due to the optical compensating member 18, a transformation 418 is made into a polarization state 201A. A transformation in polarization state due to the liquid crystal layer 15 is represented by a rotational transformation 415 about 201A. Hence, in the case where the polarization state is 201A, no transformation in polarization state is caused. Thus, in the case where only 550-nm light is considered, the effect of the liquid crystal layer is eliminated, to thereby provide favorable black display.

In contrast, FIG. 143 illustrates changes in polarization state for the visible-light spectrum (B: 450 nm, G: 550 nm, and R: 620 nm). The above-mentioned visible-light wavelengths are selected in order to consider changes in polarization state for a general color filter of the three primary colors. The light transformed by the optical compensating member 17 is dispersed as indicated by polarization states 617R, 617G, and 6173 due to the wavelength dispersion characteristics of the optical compensating member 17. After that, the optical compensating member 18 transforms the polarization state 617G into a polarization state 201A, but transforms the polarization states 617R and 617B into polarization states 618R and 618B due to the wavelength dispersion characteristics of the optical compensating member 18. Due to the liquid crystal layer, the polarization states 618R and 618B is further transformed into polarization states 615R and 615B. In this state, as can be understood from the description so far, the amount of light leakage differs for each of the red, green, and blue colors due to the wavelength dispersion characteristics of the optical compensating member, which causes coloring when viewed obliquely. When Rth's of the color filter 16 for each color are controlled independently, the polarization states 615R and 615B are transformed into polarization states 616R and 616B, which makes it possible to suppress coloring at oblique angles compared to a case where Rth's of the color filter 16 are not considered.

As can be understood from FIGS. 14A and 14B, changes in polarization state significantly differ between a case where the slow axes of the optical compensating members are perpendicular to the absorption axis of the input polarizer and a case where the slow axes of the optical compensating members are parallel thereto, and are reversed between positive and negative when the S3-direction component is considered. Hence, the polarization state 615R of the red pixel area of the color filter has a negative S3-direction component, and thus it is necessary that Rth(R) for red pixels satisfy Expression (5) in order to reduce light leakage in the red color.

[Expression 5]

$$Rth(R) < 0 \text{ nm} \tag{5}$$

Thus, also in the case where the slow axes of the optical compensating members are parallel to the absorption axis of the input polarizer, the principles of light leakage reduction is the same as the case where the slow axes of the optical compensating members are perpendicular thereto. Hence, also in the case where the slow axes of the optical compensating members are parallel to the absorption axis of the input polarizer, it is possible to make the amount of light leakage uniform, and to significantly reduce coloring, by making the distance between the polarization states 616R, 616G, and 6163 and the polarization state 201A substantially the same as each other as described in relation to FIGS. 12A and 12B.

Next, a case of o-mode illustrated in the right side of FIG. 1 is considered. In o-mode, the optical axis of the liquid crystal layer 15 is substantially parallel to the absorption axis of the polarizing layer 11B. In this case, the optical compensating members 17 and 18 are sandwiched between the liquid crystal layer 15 and the polarizing layer 12B to also serve as supporting-substrate materials.

Figure 15:
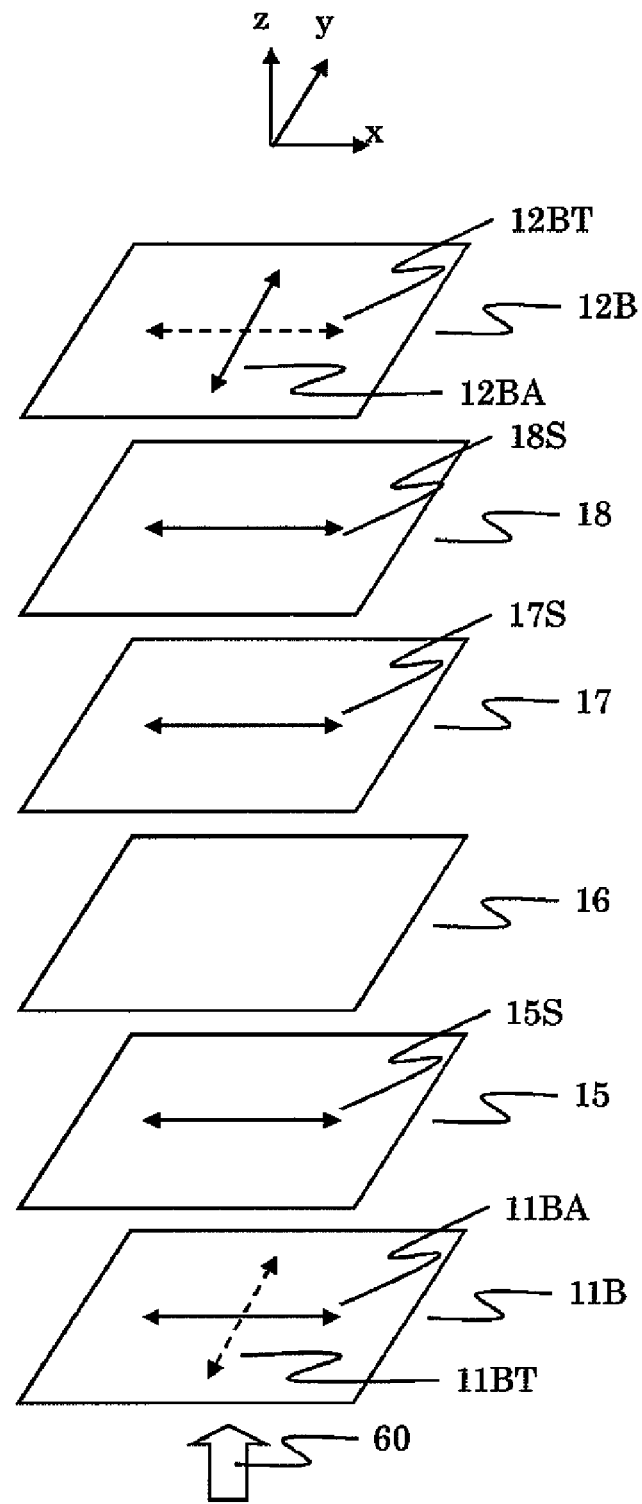
FIG. 15 is a configuration diagram illustrating an example of the liquid crystal display device of the present invention.
Figure 16A:
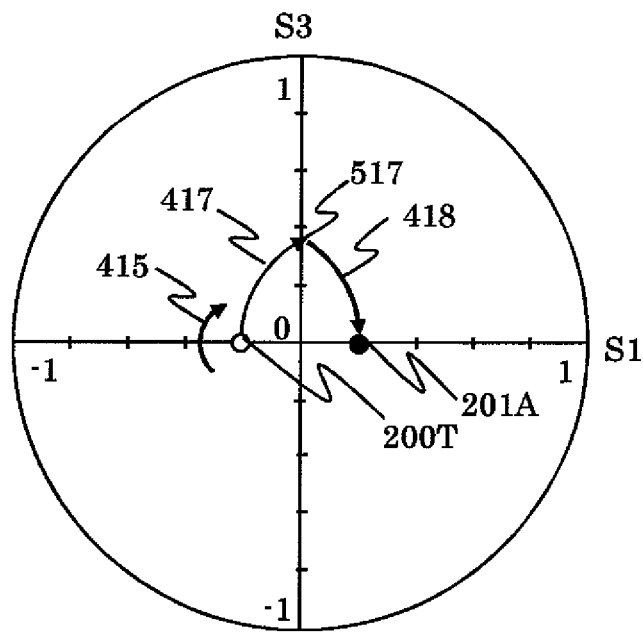
FIGS. 16A and 16B are Poincare-sphere displays for illustrating an example of the liquid crystal display device of the present invention.
Figure 16B:
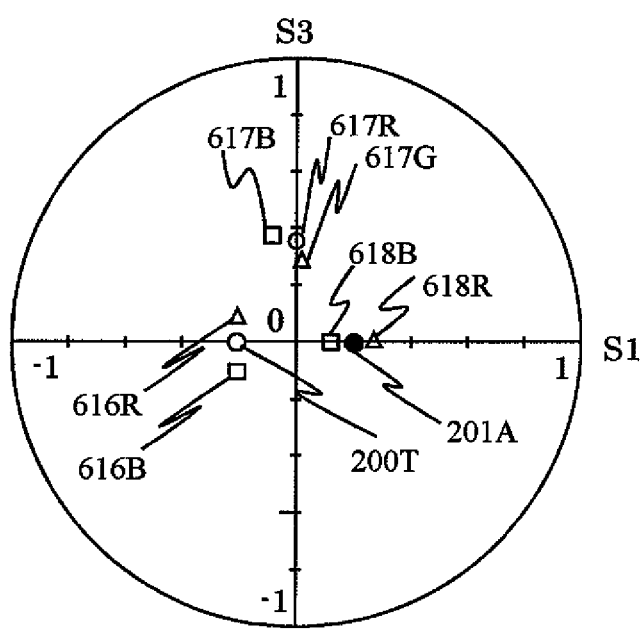

The optical configuration is illustrated in FIG. 15. Here, a case where the slow axes of the optical compensating members 17 and 18 are parallel to the absorption axis of the input polarizer is considered. Changes in polarization state in this case are illustrated in FIGS. 16A and 16B. In o-mode, as illustrated in FIG. 16A, the polarization state of the light transmitted through the transmission axis 11BT of the polarizing layer 11B is 200T. A transformation in polarization state due to the liquid crystal layer 15 is represented by a rotational transformation 415 about 200T. Hence, in the case where the polarization state is 200T, in other words, in the case where the absorption axis 11BA of the polarizing layer 11B and the slow axis 15S of the liquid crystal layer are substantially parallel, no transformation in polarization state is caused. Next, due to the optical compensating member 17, a transformation 417 is made into a polarization state 517. Further, due to the optical compensating member 18, a transformation 418 is made into a polarization state 201A. Thus, in the case where only 550-nm light is considered, the effect of the liquid crystal layer is eliminated, to thereby provide favorable black display.

In contrast, FIG. 16B illustrates changes in polarization state for the visible-light spectrum (B: 450 nm, G: 550 nm, and R: 620 nm). The above-mentioned visible-light wavelengths are selected in order to consider changes in polarization state for a general color filter of the three primary colors. As described in relation to e-mode, the optical compensating members 17 and 18 have wavelength dispersion characteristics. Hence, Rth's of the color filter are independently controlled in order to compensate for the wavelength dispersion characteristics of the optical compensating members 17 and 18. First, due to the color filter 16, a transformation is made into polarization states 616R, 616G, and 616B. After that, a transformation is made into polarization states 617R, 617G, and 617B by the optical compensating member 17, and into polarization states 618R, 618G, and 618E by the optical compensating member 18. Consequently, it is possible to compensate for the wavelength dispersion characteristics of the optical compensating members, and to suppress coloring at oblique angles compared to a case where Rth's of the color filter 16 are not considered.

In this case, it is necessary that Rth(R) for red pixels satisfy Expression (6) in order to reduce light leakage in the red color.

[Expression 6]

$$Rth(R) < 0 \text{ nm} \tag{6}$$

Figure 17:
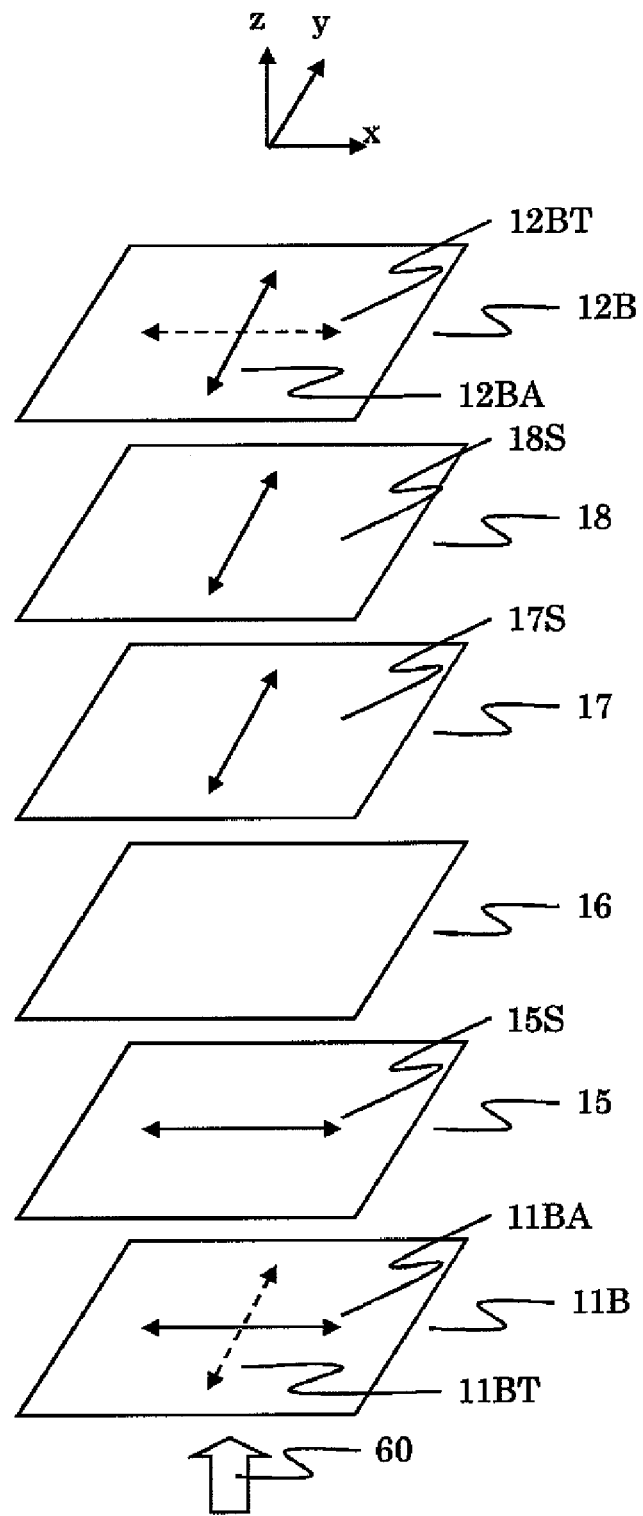
FIG. 17 is a configuration diagram illustrating an example of the liquid crystal display device of the present invention.

Next, a case where the slow axes of the optical compensating members 17 and 18 are orthogonal to the absorption axis of the input polarizer is considered in the right side of FIG. 1. While FIG. 1 illustrates the polarizer-supporting substrate materials 11A and 12A and the substrates 13 and 14, those may be ignored when the polarization state is considered. FIG. 17 is a diagram that illustrates an optical configuration in which the above-mentioned components are omitted to clearly illustrate the direction of the slow axis, within the plane parallel to the substrate, of each member.

Figure 18A:
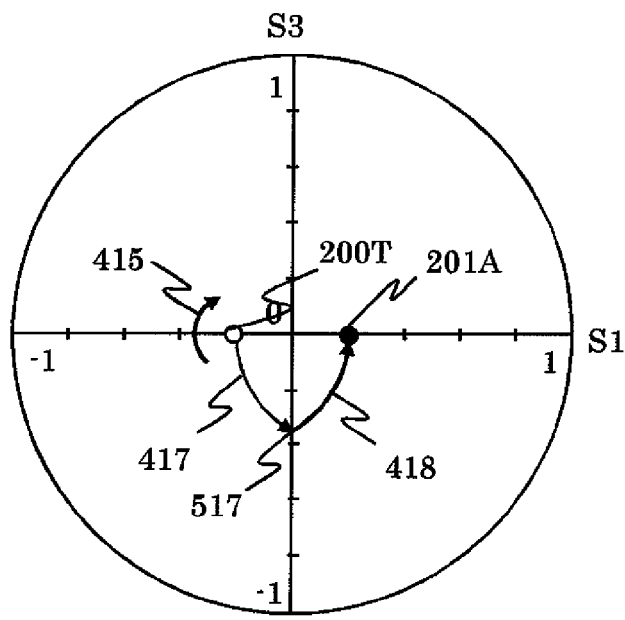
FIGS. 18A and 18B are Poincare-sphere displays for illustrating an example of the liquid crystal display device of the present invention.
Figure 18B:
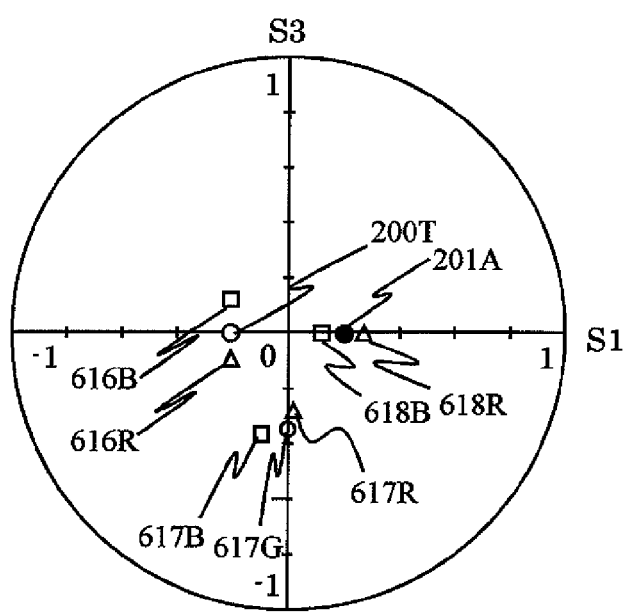

Changes in polarization state using a Poincare sphere are illustrated in FIGS. 18A and 18B. In o-mode, as illustrated in FIG. 18A, the polarization state of the light transmitted through the transmission axis 11BT of the polarizing layer 11B is 200T. A transformation in polarization state due to the liquid crystal layer 15 is represented by a rotational transformation 415 about 200T. Hence, in the case where the polarization state is 200T, in other words, in the case where the absorption axis 11BA of the polarizing layer 11B and the optical axis 15S of the liquid crystal layer are substantially parallel, no transformation in polarization state is caused. Next, due to the optical compensating member 17, a transformation 417 is made into a polarization state 517. Further, due to the optical compensating member 18, a transformation 418 is made into a polarization state 201A. Thus, in the case where only 550-nm light is considered, the effect of the liquid crystal layer is eliminated, to thereby provide favorable black display.

In contrast, FIG. 18B illustrates changes in polarization state for the visible-light spectrum (B: 450 nm, G: 550 nm, and R: 620 nm). The above-mentioned visible-light wavelengths are selected in order to consider changes in polarization state for a general color filter of the three primary colors. As described in relation to e-mode, the optical compensating members 17 and 18 have wavelength dispersion characteristics. Hence, Rth's of the color filter are independently controlled in order to compensate for the wavelength dispersion characteristics of the optical compensating members 17 and 18. First, due to the color filter 16, a transformation is made into polarization states 616R, 616G, and 616B. After that, a transformation is made into polarization states 617R, 617G, and 617B by the optical compensating member 17, and into polarization states 618R, 618G, and 618B by the optical compensating member 18. Consequently, it is possible to compensate for the wavelength dispersion characteristics of the optical compensating members, and to suppress coloring at oblique angles compared to a case where Rth's of the color filter 16 are not considered.

In this case, it is necessary that Rth(R) for red pixels satisfy Expression (7) in order to reduce light leakage in the red color.

[Expression 7]

$$Rth(R) > 0 \text{ nm} \quad (7)$$

It has been considered so far that all the four types of combinations, that is, the choice of e-mode or o-mode combined with the choice of whether the slow axis directions of the optical compensating members 17 and 18 are orthogonal or parallel to the absorption axis of the input polarizer, have substantially the same viewing-angle performance. However, such combinations differ from each other in transformations in polarization states, and are significantly different from each other in polarization states of red, green, and blue light due to the wavelength dispersion characteristics of the liquid crystal layer and the optical compensating members. In other words, in order to compensate for the wavelength dispersion characteristics with Rth's of the color filter, it is necessary to change the conditions as described above in each case. In this way, it is possible to reduce the effect of the liquid crystal layer and the optical compensating members in oblique viewing angles, and to reduce both black brightness and coloring in the oblique direction. As for Rth(B), light leakage in blue color can be reduced when Rth(B) falls within the range of Expression (4) with Nz1≧0 and Nz2≧1 satisfied in the case where the absorption axis of the polarizing layer 1113 and the slow axes of the optical compensating members 17 and 18 are substantially parallel as in the case where the absorption axis of the polarizing layer 11B and the slow axes of the optical compensating members 17 and 18 are substantially perpendicular.

Detailed examples of the concept described above are given below.

EXAMPLES

Contents of the present invention are described in further detail below by way of specific examples. The examples described below are specific examples illustrating the contents of the present invention, and the present invention is not limited to the examples. This examples includes results determined from a numerical calculation using an optical simulation employing the 4×4 matrix method disclosed in "Optics in Stratified and Anisotropic Media: 4×4-Matrix Formulation," by D. W. Berreman, 1972, Volume 62, No. 4, p. 502-510. In the simulation, a typical configuration is assumed, and the spectral characteristics of the three-wavelength cold cathodes used for normal backlight, the spectral transmission characteristics of the color filter of the three primary colors of red, green, and blue used normally, and the spectral characteristics of a Nitto Denko 1224DU for the polarizing layers of the polarizers are used. A nematic liquid crystal having an extraordinary refractive index of 1.573 and an ordinary refractive index of 1.484 is assumed as the liquid crystal molecule contained in the liquid crystal layer, and the thickness of the liquid crystal layer is 3.7 µm. Polycarbonate (PC), polystyrene, norbornene-based materials, and the like, or, alternatively, liquid-crystalline macromolecular materials are used for the wavelength dispersion of the optical compensating members, but those are not given by way of limitation.

In the embodiment described above, the color filter is uniaxial, and Rth's of the color filter are adjusted so as to reduce both black brightness and coloring in the oblique direction. Known examples of a material for adjusting Rth's of the color filter include, but are not limited to, melamine resins, porphyrin compounds, and polymerizable liquid crystal compounds.

In the embodiment described above, a configuration in which an optical compensating member is provided between the first substrate and the second substrate is also assumed. Such a technology is disclosed in, for example, Japanese Patent Application Laid-open No. 2005-3733. According to the investigations of the inventors of the present invention, one issue to be addressed by the technology lies in the surface flatness. In the case where an optical compensating member is provided between the first substrate and the second substrate, roughness of the surface of the optical compensating member may cause variations in thickness of the liquid crystal layer, to thereby result in uneven in-plane display or a reduction in contrast. According to the investigations of the inventors of the present invention, however, uneven in-plane display or a reduction in contrast are not easily caused by variations in thickness of the liquid crystal layer in an IPS mode that uses a fringe field proposed in Japanese Patent Application Laid-open No. 2001-056476, and thus such an IPS mode can be easily combined with the technology in which an optical compensating member is provided between the first substrate and the second substrate.

Figure 2:
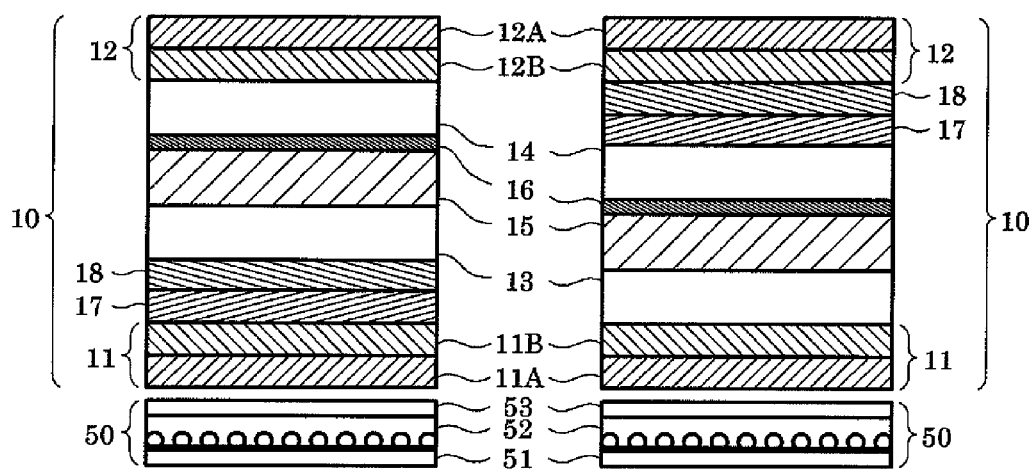
FIG. 2 is a configuration view illustrating an example of the liquid crystal display device of the present invention.

Further, the optical compensating members and the polarizing layers may be formed by applying a material onto a substrate and performing an alignment process. In this case, however, the configuration may be different from those described in the examples. Specifically, the polarizing layer may be provided on the liquid crystal layer side of the substrate. While the configuration of FIG. 1 is used in the examples, the configuration of FIG. 2 or the like may also be used. The present invention places emphasis on the optical configurations, and the effect of the present invention can be achieved by implementing one of the optical configurations described in this description. Therefore, the optical configurations are described appropriately in the examples.

Liquid crystal cells, electrode structure, substrates, polarizing layers for the polarizers, and illuminating devices conventionally used in IPS liquid crystal display devices can be directly applied to the examples below. The present invention relates to the specifications and the configuration of the optical members.

The smaller angle (pretilt angle) relative to the substrate (first substrate, second substrate, or both) of the optical axis of the liquid crystal layer during the absence of a voltage applied to the liquid crystal layer was set to 0° in the simulation shown in the examples, but large differences in the tendencies displayed in the examples below do not occur in a range between ±3°. However, the most favorable characteristics were displayed in cases where the pretilt angle was 0°.

The definitions of the terms used are described below.

To be substantially perpendicular: to form angles, the smaller one of which is in a range of 88° to 90°.

To be substantially parallel: to form angles, the smaller one of which is in a range of 0° to 2°.

To be substantially horizontal: to form angles, the smaller one of which is in a range of 0° to 3°.

e-mode: a configuration in which the absorption axis 11BA of the first polarization plate 11 and the direction of the alignment axis 155 of liquid crystal molecules with no application of voltage are substantially perpendicular.

o-mode: a configuration in which the absorption axis 11BA of the first polarization plate 11 and the direction of the alignment axis 155 of liquid crystal molecules with no application of voltage are substantially parallel (form angles, the smaller one of which is in a range of 0° to 2°).

nx: refractive index in the direction of the slow axis within the plane parallel to the substrate ny: refractive index in the direction of the fast axis within the plane parallel to the substrate nz: refractive index in the thickness direction d: thickness of the optical compensating member Re: retardation within the plane parallel to the substrate. $Re=(nx-ny)d$ Rth: retardation in the thickness direction. $Rth=((nx+ny)/2-nz)d$ Nz coefficient: $Nz=(nx-nz)/(nx-ny)$ To have a birefringence: to have Re or Rth having an absolute value of more than about 10 nm.

To be substantially isotropic: to have Re and Rth having an absolute value of about 10 nm or less.

positive a-plate: $nx>ny\approx nz$ negative a-plate: $nx\approx nz>ny$ positive c-plate: $nz>nx\approx ny$ negative c-plate: $nx\approx ny>nz$ Rth (R): Rth for red (R) pixels of the color filter at a wavelength R indicating the maximum transmittance value Rth(G): Rth for green (G) pixels of the color filter at a wavelength G indicating the maximum transmittance value Rth(B): Rth for blue (B) pixels of the color filter at a wavelength B indicating the maximum transmittance value Uniaxial anisotropic optical compensating members are used in the examples. According to the investigations of the inventors of the present invention, however, the optical compensating members are not necessarily a positive a-plate, a negative a-plate, a positive c-plate, or a negative c-plate, and it is possible to consider that Nz, which represents an Nz coefficient of those components, satisfies $0.8<Nz<1.2$ for the positive a-plate, $-0.2<Nz<0.2$ for the negative a-plate, $Nz<-5$ for the positive c-plate, and $Nz>5$ for the negative c-plate.

Example 1

The structure of this example is illustrated in the left side of FIG. 1, and the optical configuration of e-mode is illustrated in FIG. 9. In this example, an optical compensating member whose Nz1, which is an Nz coefficient as the optical compensating member 17, satisfies Nz1=1 (Nz≧1) and an optical compensating member whose Nz2, which is an Nz coefficient as the optical compensating member 18, satisfies Nz2=−1 (Nz≦0) are used. The optical compensating members with Nz≧1 and with Nz≦0 used in this example can be easily fabricated compared to an optical compensating member with 0<Nz<1, and therefore provide a very wide range of choices in the selection of the material. Hence, the use of optical compensating members with Nz in the above-mentioned range enables the use of various materials.

It is necessary to determine evaluation indices. Because the present invention aims to reduce changes in brightness and changes in chromaticity when the viewing angle is changed during black display, respective evaluation indices are introduced.

Figure 19:
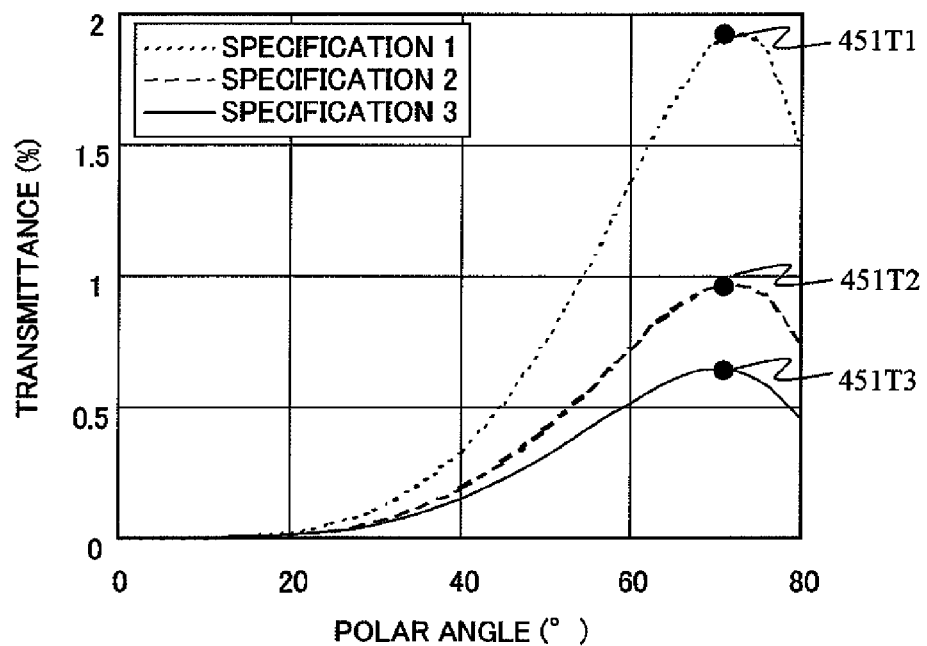
FIG. 19 is a conceptual diagram for illustrating evaluation indices used in an example of the present invention.

As the index of changes in brightness, the maximum transmittance value at the time when the viewing angle is changed is introduced. The transmittance is a value obtained with input light at a wavelength of 400 to 700 nm in consideration of luminosity factor. This is described with reference to FIG. 19. In FIG. 19, the viewing-angle transmittance characteristics during black display for three types of liquid crystal display devices with an optical compensating member having different specifications are evaluated. The transmittance is illustrated for a fixed azimuth angle, where only the polar angle is changed. FIG. 19 demonstrates that specification 3 has the most favorable brightness change characteristics. It can be understood here that the same results are obtained even when comparing the maximum transmittance values for the respective specifications. The maximum transmittance values for specifications 1, 2, 3 are 451T1, 451T2, and 451T3, respectively. If the maximum transmittance value is small, the change in brightness accompanying a change of the viewing angle can also be said to be small. In a configuration in which no optical compensating member is provided as illustrated in FIG. 7, the maximum transmittance during black display is approximately 1.2%.

Figure 20:
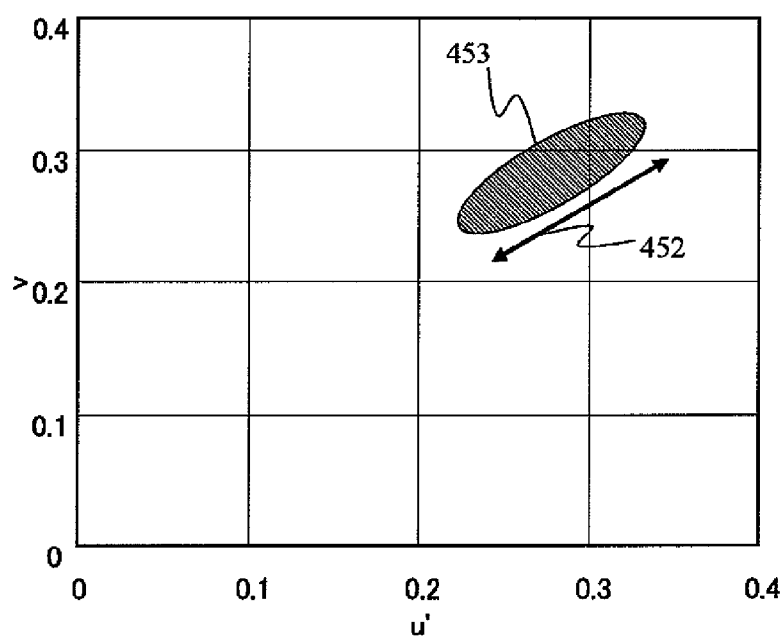
FIG. 20 is a conceptual diagram for illustrating evaluation indices used in an example of the present invention.

As the index of changes in chromaticity, Δu'v' is introduced. This is illustrated in FIG. 20. In FIG. 20, color during black display in the configuration of FIG. 7 is plotted in a u'v' chromaticity diagram, and all chromaticity coordinates viewed from all azimuth angles and all polar-angle directions are plotted. As a result, an elliptical region illustrated in FIG. 20 is obtained. Reducing changes in chromaticity accompanying changes in viewing angle is equivalent to reducing the elliptical region illustrated in FIG. 20. Thus, the length of the major axis of the ellipse is used as the evaluation index, which is represented as Δu'v'. In a configuration in which no optical compensating member is provided as illustrated in FIG. 7, Δu'v' during black display is approximately 0.13.

Figure 21:
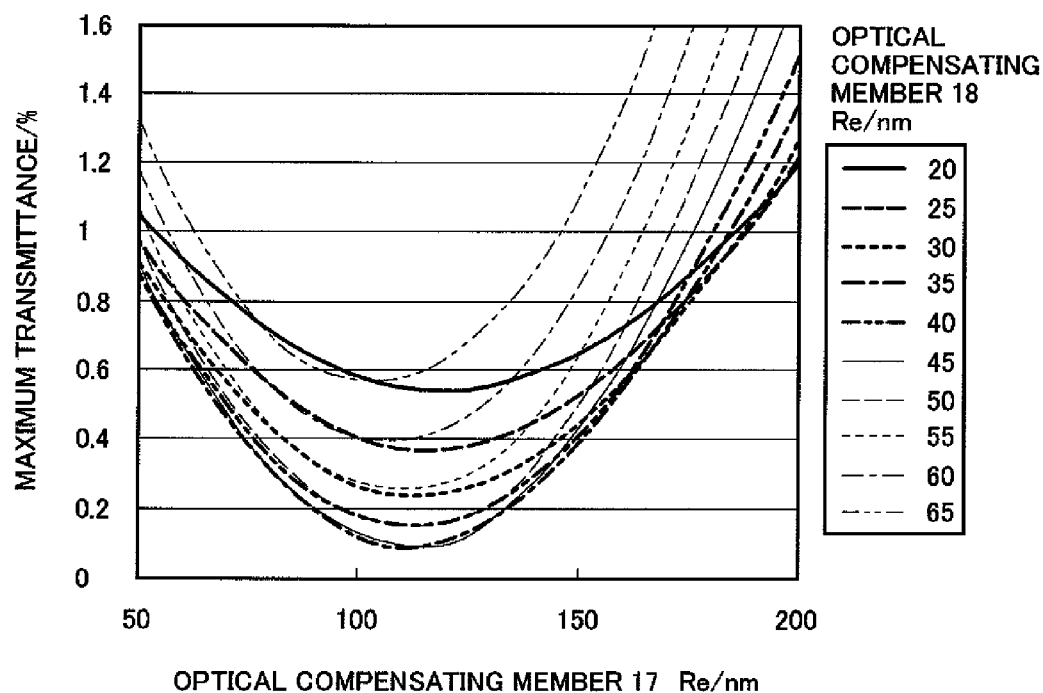
FIG. 21 is a characteristic diagram of a comparative example of the liquid crystal display device of the present invention.
Figure 22:
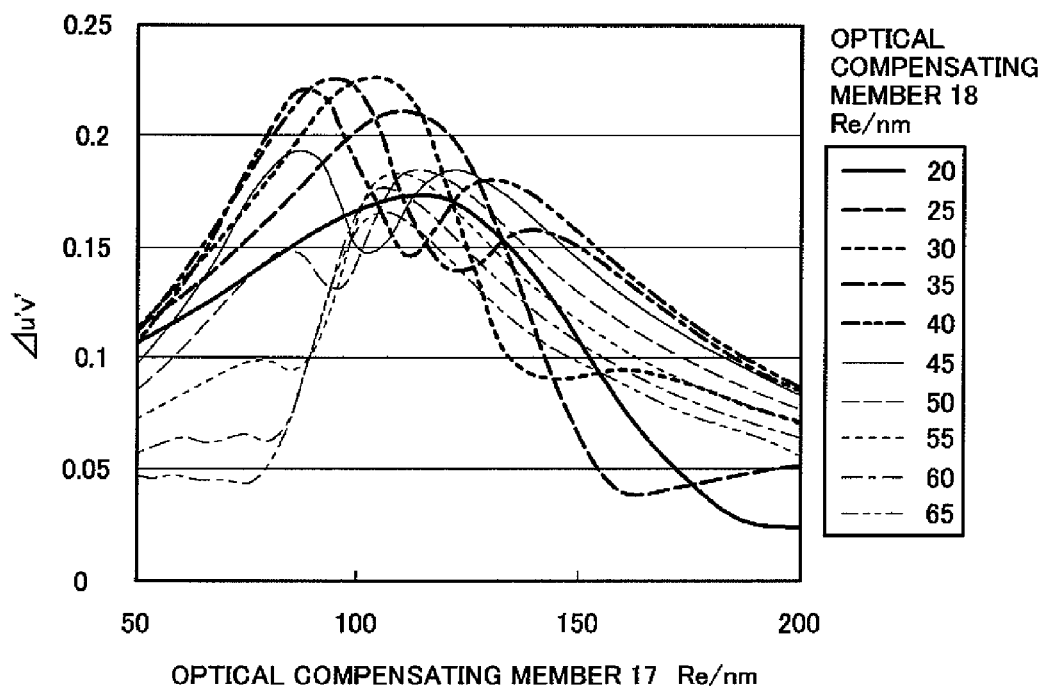
FIG. 22 is a characteristic diagram of a comparative example of the liquid crystal display device of the present invention.
Figure 23:
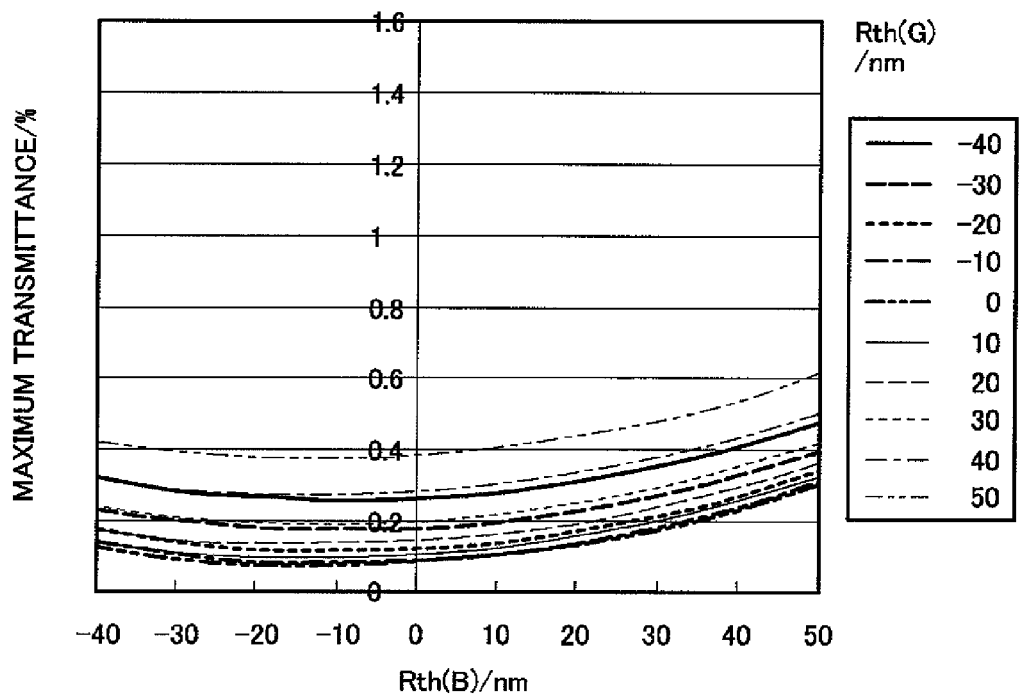
FIG. 23 is a characteristic diagram of an example of the liquid crystal display device of the present invention.
Figure 24:
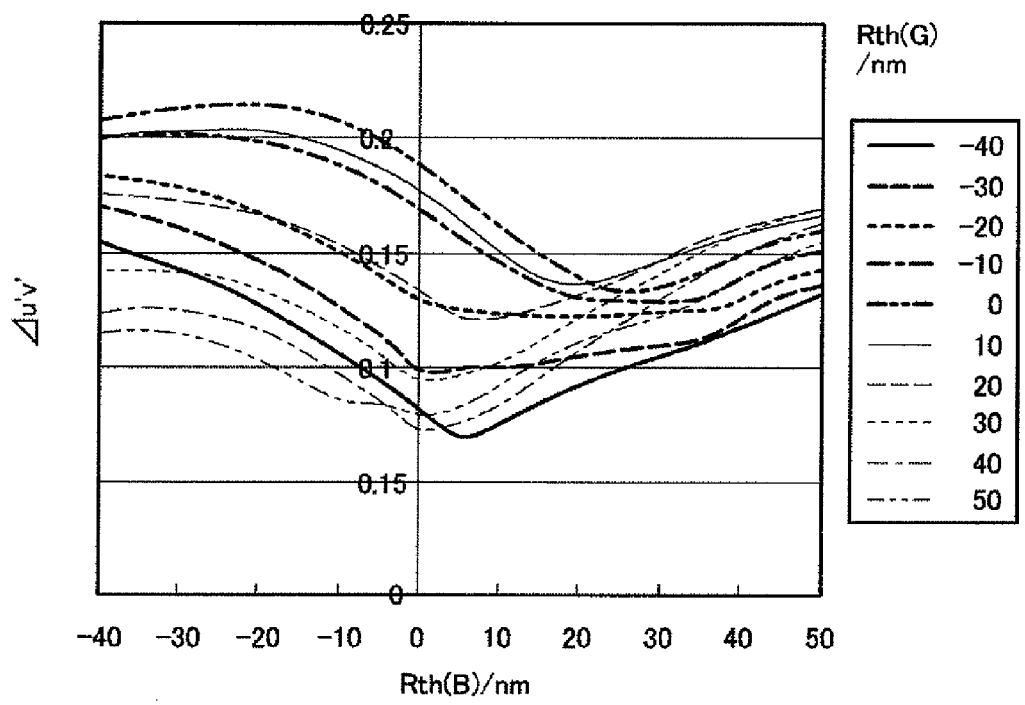
FIG. 24 is a characteristic diagram of an example of the liquid crystal display device of the present invention.
Figure 25:
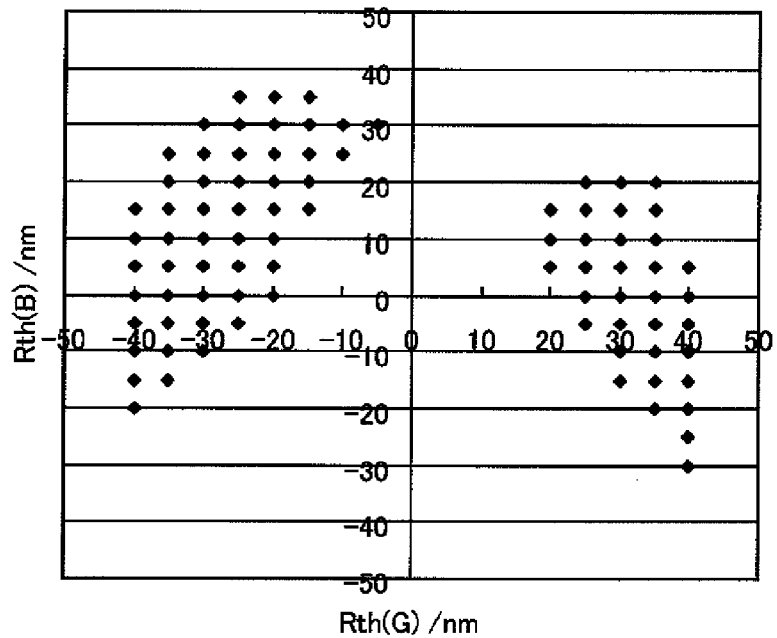
FIG. 25 is a characteristic diagram of an example of the liquid crystal display device of the present invention.
Figure 26:
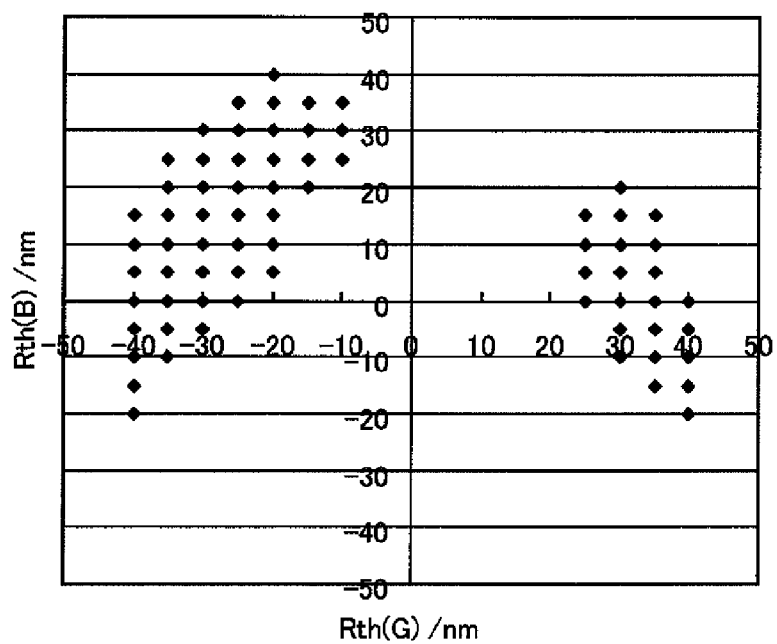
FIG. 26 is a characteristic diagram of an example of the liquid crystal display device of the present invention.
Figure 27:
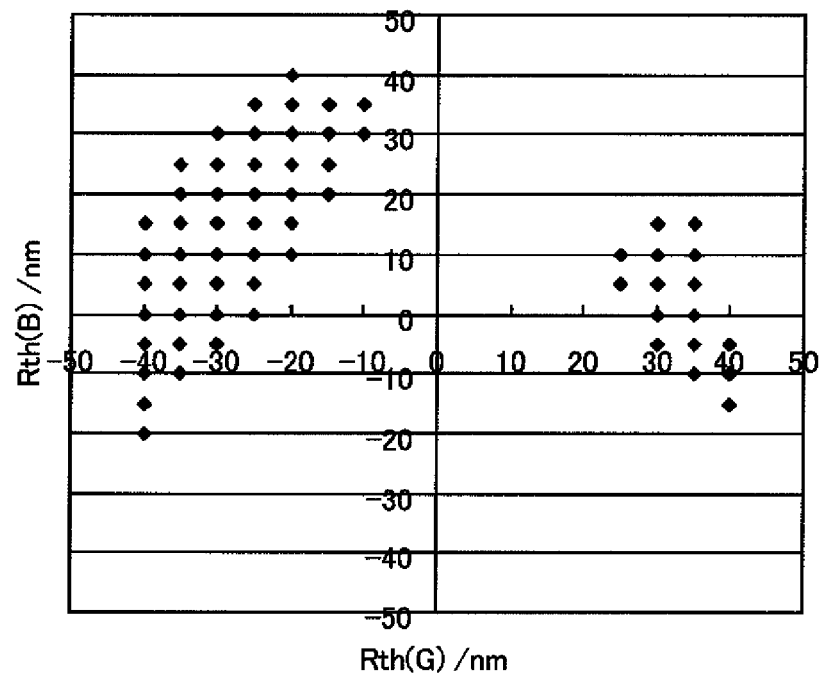
FIG. 27 is a characteristic diagram of an example of the liquid crystal display device of the present invention.
Figure 28:
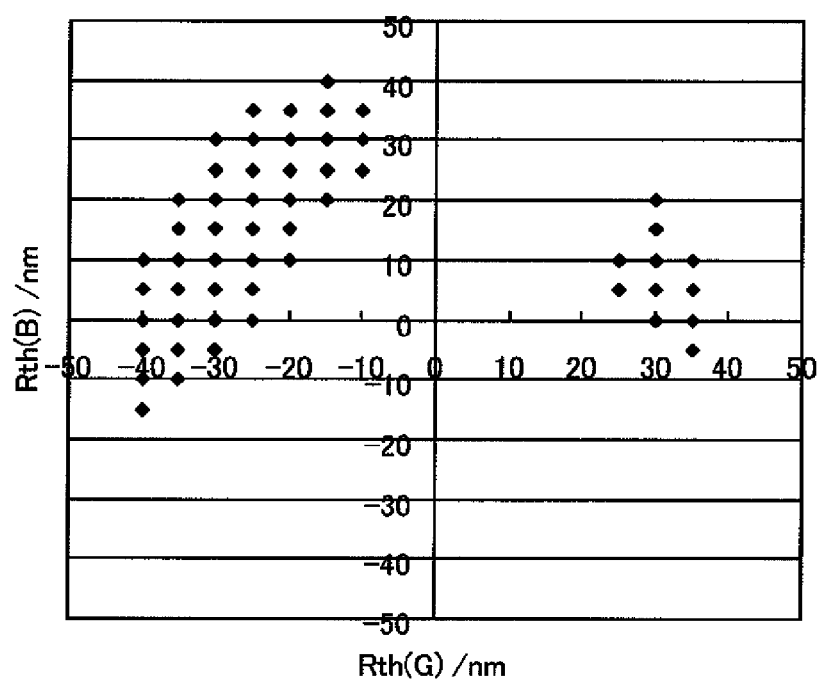
FIG. 28 is a characteristic diagram of an example of the liquid crystal display device of the present invention.
Figure 29:
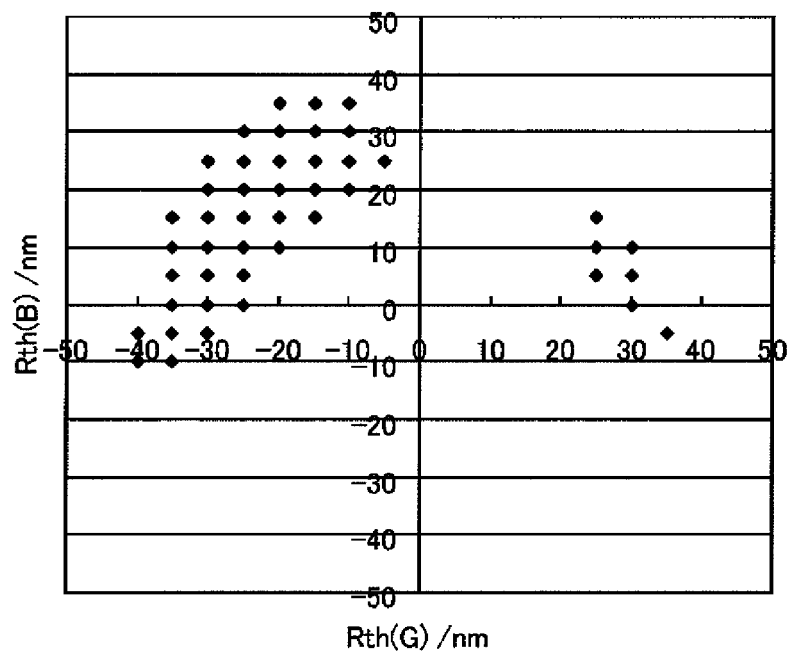
FIG. 29 is a characteristic diagram of an example of the liquid crystal display device of the present invention.

Meanwhile, the maximum transmittance and Δu'v' for a case where an optical compensating member with Nz1=1 is used as the optical compensating member 17, an optical compensating member with Nz2=−1 is used as the optical compensating member 18, and Rth's of the color filter layer are not considered (0 nm) are illustrated in FIGS. 21 and 22, respectively. Thus, there is a trade-off relation between the maximum transmittance and Δu'v', and the maximum transmittance becomes least at 0.29% with Δu'v' of 0.13 or less when Re of the optical compensating member 17 is 130 nm and Re of the optical compensating member 18 is 30 nm. In the case where the maximum transmittance is given priority, in contrast, Δu'v' is 0.18 when Re of the optical compensating member 17 is 115 nm and Re of the optical compensating member 18 is 45 nm. The maximum transmittance and Δu'v' with the optical compensating members fixed to the above-mentioned values and with Rth's of the color filter layer varied are illustrated in FIGS. 23 and 24, respectively. As one example, Rth(R) is set to 5 nm. As can be understood also from FIGS. 23 and 24, both the maximum transmittance and Δu'v' can be reduced by varying Rth's of the color filter layer. Regions in which Δu'v' is 0.13 or less and the maximum transmittance is 0.29% or less are indicated in FIG. 25. Also for cases where Rth(R) is 15, 25, 35, and 45 nm, such regions are indicated in FIGS. 26, 27, 28, and 29, respectively. Among those, the region with Rth(R) nm, Rth(G)=−20 nm, and Rth (B)=0 nm has the most favorable performance with Δu'v' of 0.13 or less and a maximum transmittance of 0.13%. As illustrated in the drawings, there are conditions when Δu'v' can be 0.13 or less and the maximum transmittance can be 0.29% or less in a range where Rth(R) is more than 0 nm and less than 50 nm. Rth(R) is preferably 5 nm or more and 35 nm or less. Further, in the case where the Nz coefficient is in the above-mentioned range with other values (such as the Re values of the optical compensating members 17 and 18 and the optical constant of the liquid crystal molecules) appropriately adjusted, the maximum transmittance and Δu'v' can be reduced when Rth(R) is set in a range of more than 0 nm and less than 50 nm. Also in the case where the Nz coefficient is outside the above-mentioned range, likewise, the maximum transmittance and Δu'v' can be reduced when Rth(R) is set in a range of more than 0 nm and less than 50 nm, preferably 5 nm or more and 35 nm or less. The same applies to the case where the optical configuration of FIG. 17 is used. In the case where the optical configuration of FIG. 13 or 15 is used, likewise, Rth(R) is set in a range of less than 0 nm and more than −50 nm, preferably −5 nm or less and −35 nm or more.

Figure 30:
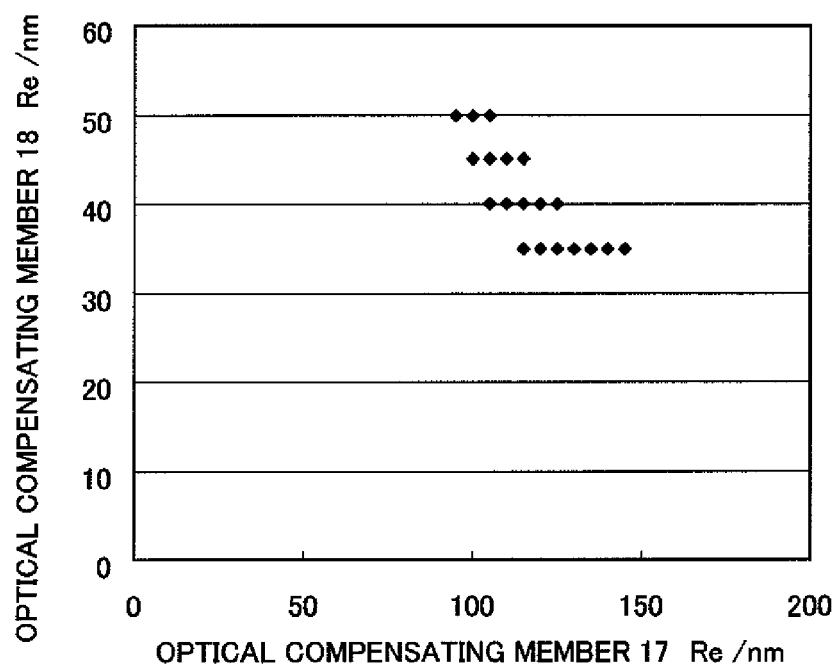
FIG. 30 is a characteristic diagram of an example of the liquid crystal display device of the present invention.

Next, regions in which Δu'v' is 0.13 or less and the maximum transmittance is 0.29% or less when Re's of the optical compensating members are varied with Rth(R)=5 nm, Rth(G)=−20 nm, and Rth(B)=0 nm are indicated in FIG. 30. Thus, varying Rth's of the color filter layer allows the use of a wide range of optical compensating members that could not be used so far.

Example 2

Figure 31:
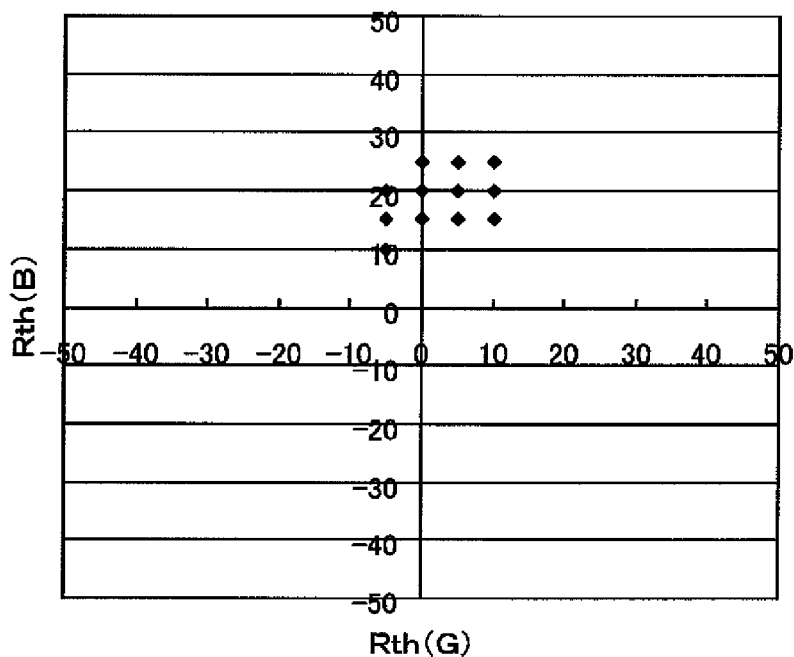
FIG. 31 is a characteristic diagram of an example of the liquid crystal display device of the present invention.

A schematic structure of this example is illustrated in the left side of FIG. 1, and a schematic optical configuration of e-mode is illustrated in FIG. 9. While the optical compensating members 17 and 18 are illustrated in the left side of FIG. 1 and FIG. 9, a single optical compensating member with Nz=0.5 (0.4<Nz<0.6) is used as the optical compensating member in this example. In the case where Rth's of the color filter layer are not considered (0 nm), the maximum transmittance becomes least at 0.10% with Δu'v' of 0.13 or less when Re of the optical compensating member is 250 nm. In the case where the maximum transmittance is given priority, in contrast, Δu'v' is 0.15 and the maximum transmittance is 0.09% when Re of the optical compensating member is 260 nm. Regions in which Δu'v' is 0.13 or less and the maximum transmittance is 0.10% or less with the optical compensating member fixed to the above-mentioned value and with Rth's of the color filter layer varied are indicated in FIG. 31. As one example, Rth(R) is set to 10 nm. As can be understood also from the drawings, both the maximum transmittance and Δu'v' can be reduced by varying Rth's of the color filter layer. Among those, the region with Rth (R)=10 nm, Rth(G)=0 nm, and Rth(B)=15 nm has the most favorable performance with Δu'v' of 0.13 or less and a maximum transmittance of 0.08%. In the case where the optical compensating member with the Nz coefficient in the above-mentioned range is used in a range where other values (such as the Re value of the optical compensating member and the optical constant of the liquid crystal molecules) are appropriately adjusted, Δu'v' and the maximum transmittance can be reduced by setting Rth(B) to satisfy 0 nm<Rth(B)≦30 nm.

Example 3

Figure 32:
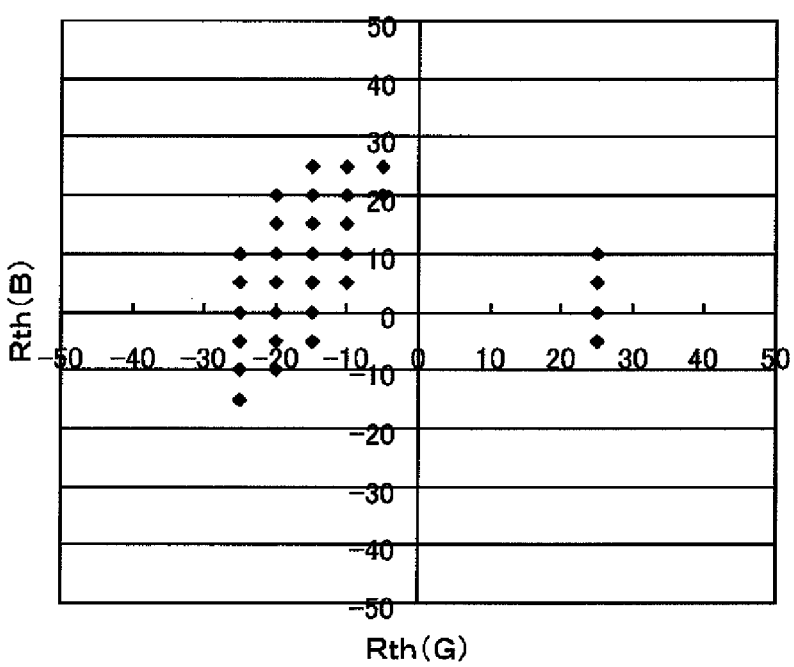
FIG. 32 is a characteristic diagram of an example of the liquid crystal display device of the present invention.

A structure of this example is illustrated in the left side of FIG. 1, and an optical configuration of e-mode is illustrated in FIG. 9. In this example, an optical compensating member with Nz1=0.7 (0.5<Nz1<1) is used as the optical compensating member 17, and an optical compensating member with Nz2=−6 (Nz2<0.5) is used as the optical compensating member 18. In the case where Rth's of the color filter layer are not considered (0 nm), the maximum transmittance becomes least at 0.17% with Δu'v' of 0.13 or less when Re of the optical compensating member 17 is 185 nm and Re of the optical compensating member 18 is 5 nm. In the case where the maximum transmittance is given priority, in contrast, Δu'v' is 0.16 and the maximum transmittance is 0.07% when Re of the optical compensating member 17 is 170 nm and Re of the optical compensating member 18 is 8 nm. Regions in which Δu'v' is 0.13 or less and the maximum transmittance is 0.17% or less with the optical compensating members fixed to the above-mentioned values and with Rth's of the color filter layer varied are indicated in FIG. 32. As one example, Rth(R) is set to 10 nm. As can be understood also from the drawings, both the maximum transmittance and Δu'v' can be reduced by varying Rth's of the color filter layer. Among those, the region with Rth(R)=10 nm, Rth(G)=−10 nm, and Rth(B)=5 nm has the most favorable performance with Δu'v' of 0.13 or less and a maximum transmittance of 0.08%. In the case where the optical compensating members with the Nz coefficients in the above-mentioned ranges are used in a range where other values (such as the Re values of the optical compensating members 17 and 18 and the optical constant of the liquid crystal molecules) are appropriately adjusted, Δu'v' and the maximum transmittance can be reduced by setting Rth(B) to satisfy |Rth(B)|≦30 nm.

Example 4

Figure 33:
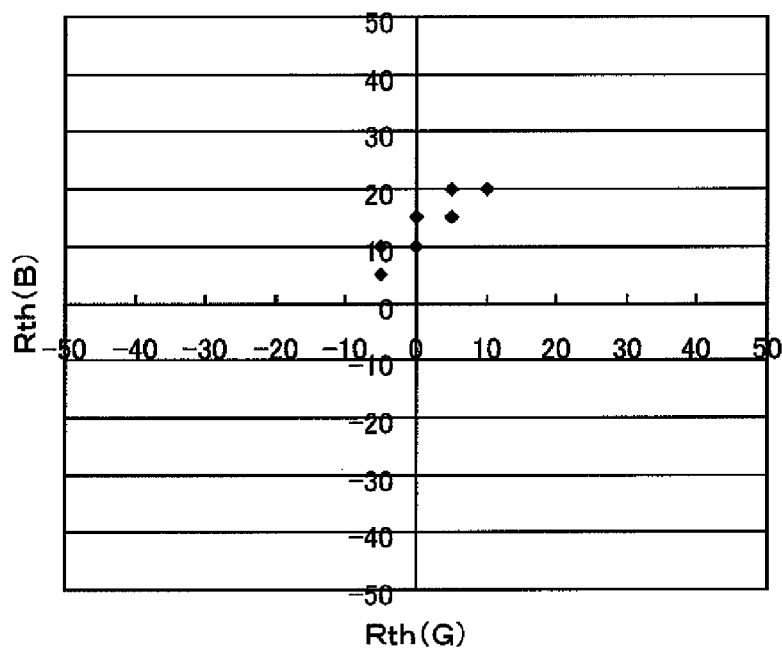
FIG. 33 is a characteristic diagram of an example of the liquid crystal display device of the present invention.

A structure of this example is illustrated in the left side of FIG. 1, and an optical configuration of e-mode is illustrated in FIG. 9. In this example, an optical compensating member with Nz1=6 (Nz1>0.5) is used as the optical compensating member 17, and an optical compensating member with Nz2=0.3 (0<Nz2<0.5) is used as the optical compensating member 18. In the case where Rth's of the color filter layer are not considered (0 nm), the maximum transmittance becomes least at 0.11% with Δu'v' of 0.13 or less when Re of the optical compensating member 17 is 9 nm and Re of the optical compensating member 18 is 155 nm. In the case where the maximum transmittance is given priority, in contrast, Δu'v' is 0.15 and the maximum transmittance is 0.10% when Re of the optical compensating member 17 is 9 nm and Re of the optical compensating member 18 is 160 nm. Regions in which Δu'v' is 0.13 or less and the maximum transmittance is 0.11% or less with the optical compensating members fixed to the above-mentioned values and with Rth's of the color filter layer varied are indicated in FIG. 33. As one example, Rth(R) is set to 10 nm. As can be understood also from the drawings, both the maximum transmittance and Δu'v' can be reduced by varying Rth's of the color filter layer. Among those, the region with Rth(R)=10 nm, Rth(G)=0 nm, and Rth(B)=10 nm has the most favorable performance with Δu'v' of 0.13 or less and a maximum transmittance of 0.09%. In the case where the optical compensating members with the Nz coefficients in the above-mentioned ranges are used in a range where other values (such as the Re value of the optical compensating members 17 and 18 and the optical constant of the liquid crystal molecules) are appropriately adjusted, Δu'v' and the maximum transmittance can be reduced by setting Rth(B) to satisfy 0 nm<Rth(B)≦25 nm.

Example 5

Figure 34:
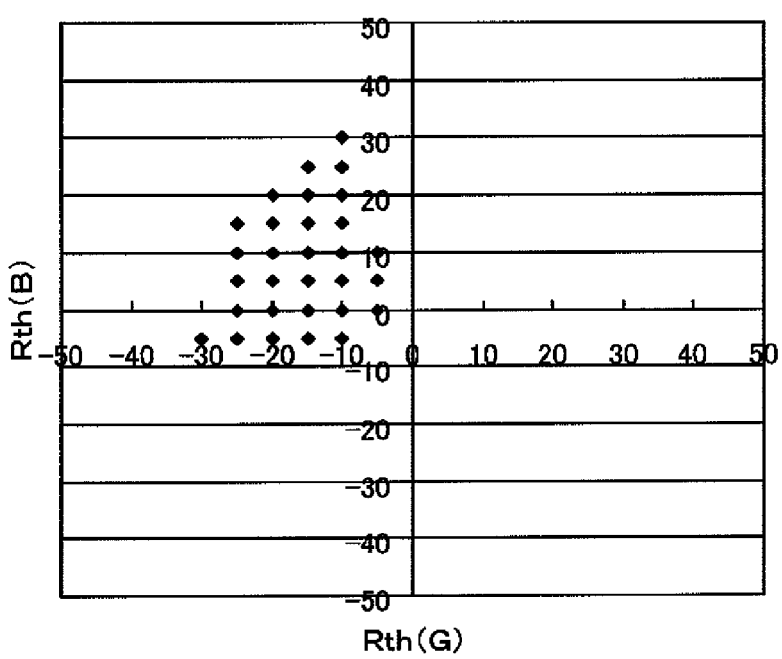
FIG. 34 is a characteristic diagram of an example of the liquid crystal display device of the present invention.

A structure of this example is illustrated in the right side of FIG. 1, and an optical configuration of o-mode is illustrated in FIG. 17. In this example, an optical compensating member with Nz1=1 (Nz1>0.5) is used as the optical compensating member 17, and an optical compensating member with Nz2=-1 (Nz2<0.5) is used as the optical compensating member 18. In the case where Rth's of the color filter layer are not considered (0 nm), the maximum transmittance becomes least at 0.23% with Δu'v' of 0.13 or less when Re of the optical compensating member 17 is 95 nm and Re of the optical compensating member 18 is 50 nm. In the case where the maximum transmittance is given priority, in contrast, Δu'v' is 0.14 and the maximum transmittance is 0.10% when Re of the optical compensating member 17 is 110 nm and Re of the optical compensating member 18 is 40 nm. Regions in which Δu'v' is 0.13 or less and the maximum transmittance is 0.10% or less with the optical compensating members fixed to the above-mentioned values and with Rth's of the color filter layer varied are indicated in FIG. 34. As one example, Rth(R) is set to 10 nm. As can be understood also from the drawings, both the maximum transmittance and Δu'v' can be reduced by varying Rth's of the color filter layer. Among those, the region with Rth (R)=10 nm, Rth(G)=-5 nm, and Rth(B)=0 nm has the most favorable performance with Δu'v' of 0.13 or less and a maximum transmittance of 0.09%. In the case where the optical compensating members with the Nz coefficients in the above-mentioned ranges are used in a range where other values (such as the Re values of the optical compensating members 17 and 18 and the optical constant of the liquid crystal molecules) are appropriately adjusted, Δu'v' and the maximum transmittance can be reduced by setting Rth(B) to satisfy |Rth(B)|≦30 nm.

Example 6

Figure 35:
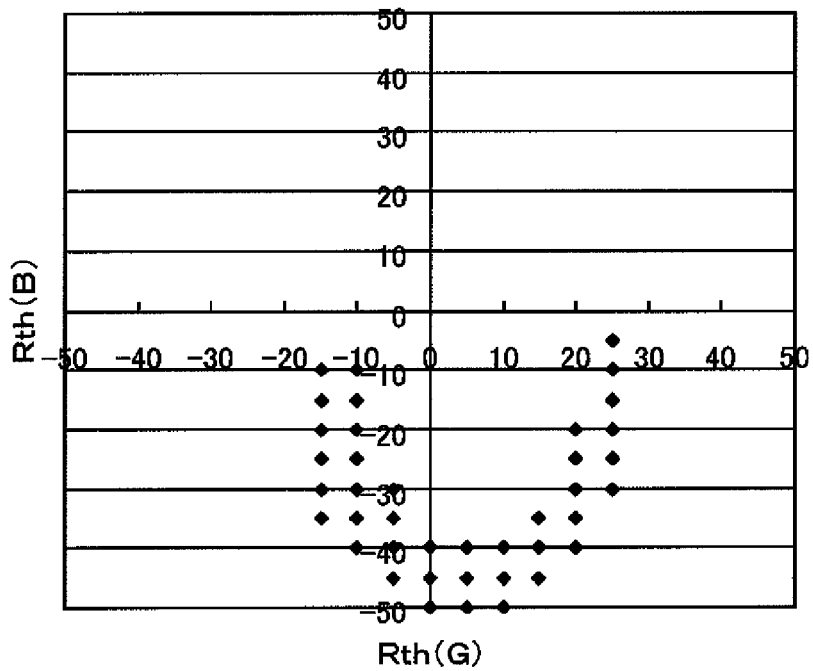
FIG. 35 is a characteristic diagram of an example of the liquid crystal display device of the present invention.

A schematic structure of this example is illustrated in the right side of FIG. 1, and a schematic optical configuration of o-mode is illustrated in FIG. 17. While the optical compensating members 17 and 18 are illustrated in the right side of FIG. 1 and FIG. 17, a single optical compensating member with Nz=0.5 (0.4<Nz<0.6) is used as the optical compensating member in this example. In the case where Rth's of the color filter layer are not considered (0 nm), the maximum transmittance becomes least at 0.12% with Δu'v' of 0.13 or less when Re of the optical compensating member is 245 nm. In the case where the maximum transmittance is given priority, in contrast, Δu'v' is 0.15 and the maximum transmittance is 0.10% when Re of the optical compensating member is 260 nm. Regions in which Δu'v' is 0.13 or less and the maximum transmittance is 0.10% or less with the optical compensating member fixed to the above-mentioned value and with Rth's of the color filter layer varied are indicated in FIG. 35. As one example, Rth(R) is set to 10 nm. As can be understood also from the drawings, both the maximum transmittance and Δu'v' can be reduced by varying Rth's of the color filter layer. Among those, the region with Rth (R)=10 nm, Rth(G)=-5 nm, and Rth(B)=-30 nm has the most favorable performance with Δu'v' of 0.13 or less and a maximum transmittance of 0.07%. In the case where the optical compensating member with the Nz coefficient in the above-mentioned range is used in a range where other values (such as the Re value of the optical compensating member and the optical constant of the liquid crystal molecules) are appropriately adjusted, Δu'v' and the maximum transmittance can be reduced by setting Rth(B) to satisfy -50 nm≦Rth(B)≦0 nm.

Example 7

Figure 36:
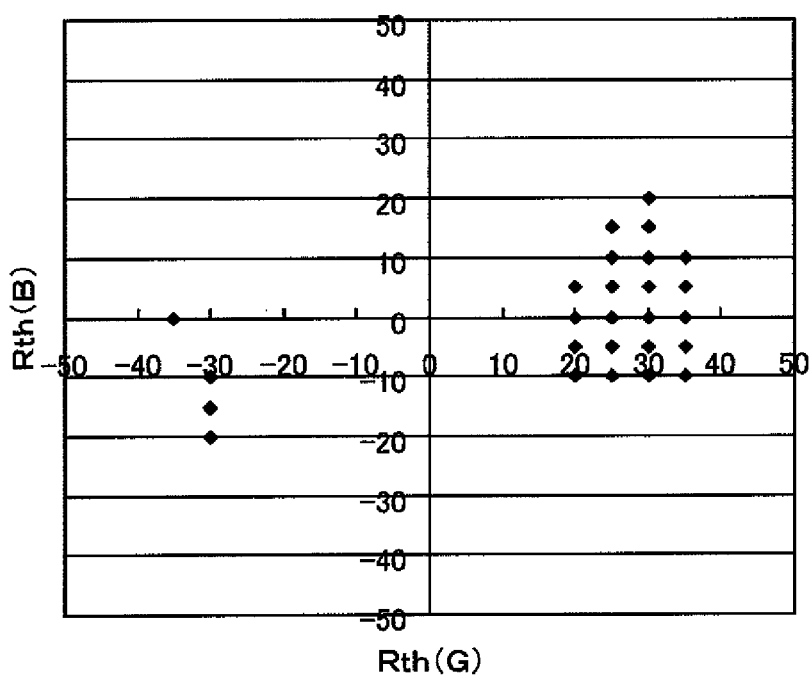
FIG. 36 is a characteristic diagram of an example of the liquid crystal display device of the present invention.

A structure of this example is illustrated in the left side of FIG. 1, and an optical configuration of e-mode is illustrated in FIG. 13. In this example, an optical compensating member with Nz1=-1 (Nz1≦0) is used as the optical compensating member 17, and an optical compensating member with Nz2=1 (Nz2≧1) is used as the optical compensating member 18. In the case where Rth's of the color filter layer are not considered (0 nm), the maximum transmittance becomes least at 0.30% with Δu'v' of 0.13 or less when Re of the optical compensating member 17 is 30 nm and Re of the optical compensating member 18 is 120 nm. In the case where the maximum transmittance is given priority, in contrast, Δu'v' is 0.18 and the maximum transmittance is 0.10% when Re of the optical compensating member 17 is 45 nm and Re of the optical compensating member 18 is 110 nm. Regions in which Δu'v' is 0.13 or less and the maximum transmittance is 0.30% or less with the optical compensating members fixed to the above-mentioned values and with Rth's of the color filter layer varied are indicated in FIG. 36. As one example, Rth(R) is set to -40 nm. As can be understood also from the drawings, both the maximum transmittance and Δu'v' can be reduced by varying Rth's of the color filter layer. Among those, the region with Rth(R)=-40 nm, Rth(G)=20 nm, and Rth(B)=-5 nm has the most favorable performance with Δu'v' of 0.13 or less and a maximum transmittance of 0.15%. In the case where the optical compensating members with the Nz coefficients in the above-mentioned ranges are used in a range where other values (such as the Re values of the optical compensating members 17 and 18 and the optical constant of the liquid crystal molecules) are appropriately adjusted, Δu'v' and the maximum transmittance can be reduced by setting Rth(B) to satisfy |Rth(B)|≦40 nm.

In the case where the structure in the left side of FIG. 1 and the optical configuration of e-mode of FIG. 9 are used, an optical compensating member with Nz1≧1 is used as the optical compensating member 17 and an optical compensating member with Nz2≦0 is used as the optical compensating member 18. In the case where the optical compensating members with the Nz coefficient in the above-mentioned range are used in a range where other values (such as the Re values of the optical compensating members 17 and 18 and the optical constant of the liquid crystal molecules) are appropriately adjusted, Δu'v' and the maximum transmittance can be reduced by setting Rth(B) to satisfy |Rth(B)|≦40 nm.

Example 8

Figure 37:
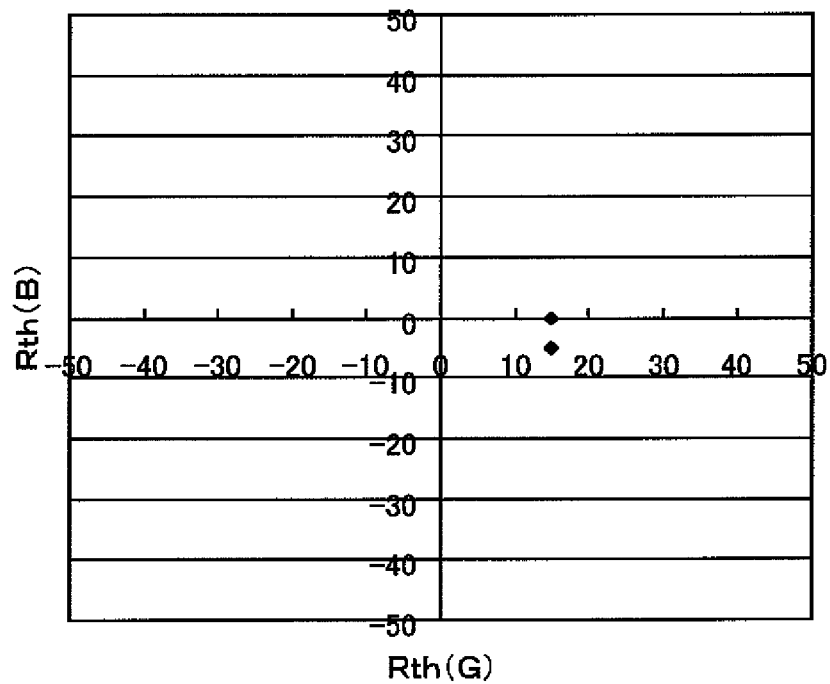
FIG. 37 is a characteristic diagram of an example of the liquid crystal display device of the present invention.

A schematic structure of this example is illustrated in the left side of FIG. 1, and a schematic optical configuration of e-mode is illustrated in FIG. 13. While the optical compensating members 17 and 18 are illustrated in the left side of FIG. 1 and FIG. 13, a single optical compensating member with Nz=0.5 (0.4<Nz<0.6) is used as the optical compensating member in this example. In the case where Rth's of the color filter layer are not considered (0 nm), the maximum transmittance becomes least at 0.12% with Δu'v' of 0.13 or less when Re of the optical compensating member is 245 nm. In the case where the maximum transmittance is given priority, in contrast, Δu'v' is 0.15 and the maximum transmittance is 0.10% when Re of the optical compensating member is 260 nm. Regions in which Δu'v' is 0.13 or less and the maximum transmittance is 0.12% or less with the optical compensating member fixed to the above-mentioned value and with Rth's of the color filter layer varied are indicated in FIG. 37. As one example, Rth(R) is set to −25 nm. As can be understood also from the drawings, both the maximum transmittance and Δu'v' can be reduced by varying Rth's of the color filter layer. Among those, the region with Rth (R)=−25 nm, Rth(G)=15 nm, and Rth(B)=−5 nm has the most favorable performance with Δu'v' of 0.13 or less and a maximum transmittance of 0.110. In the case where the optical compensating member with the Nz coefficient in the above-mentioned range is used in a range where other values (such as the Re value of the optical compensating member and the optical constant of the liquid crystal molecules) are appropriately adjusted, Δu'v' and the maximum transmittance can be reduced by setting Rth(B) to satisfy −30 nm≦Rth(B)≦0 nm.

Example 9

Figure 38:
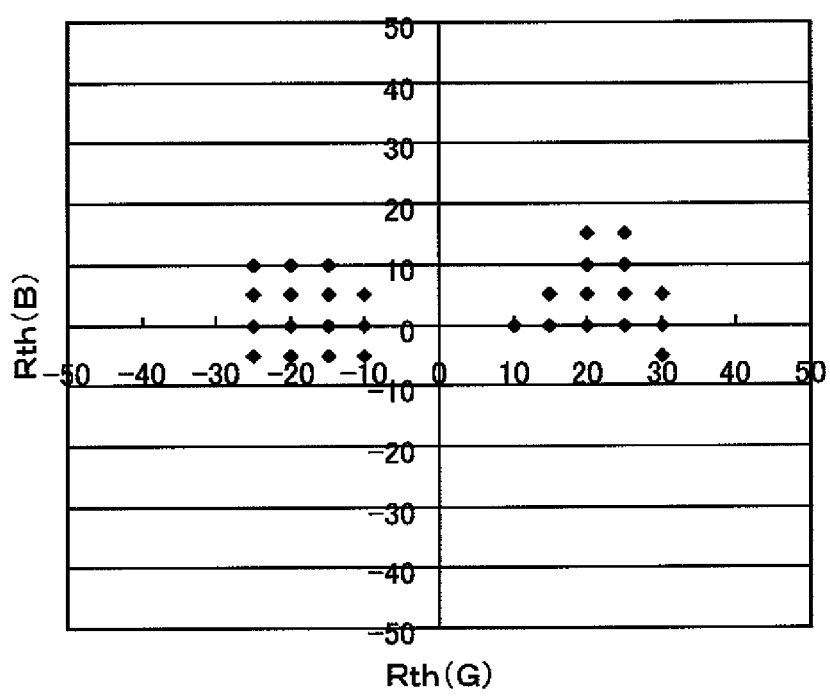
FIG. 38 is a characteristic diagram of an example of the liquid crystal display device of the present invention.

A structure of this example is illustrated in the left side of FIG. 1, and an optical configuration of e-mode is illustrated in FIG. 13. In this example, an optical compensating member with Nz1=0.3 (0<Nz1<0.5) is used as the optical compensating member 17, and an optical compensating member with Nz2=6 (Nz2>0.5) is used as the optical compensating member 18. In the case where Rth's of the color filter layer are not considered (0 nm), the maximum transmittance becomes least at 0.20% with Δu'v' of 0.13 or less when Re of the optical compensating member 17 is 190 nm and Re of the optical compensating member 18 is 5 nm. In the case where the maximum transmittance is given priority, in contrast, Δu'v' is 0.15 and the maximum transmittance is 0.07% when Re of the optical compensating member 17 is 165 nm and Re of the optical compensating member 18 is 9 nm. Regions in which Δu'v' is 0.13 or less and the maximum transmittance is 0.20% or less with the optical compensating members fixed to the above-mentioned values and with Rth's of the color filter layer varied are indicated in FIG. 38. As one example, Rth(R) is set to −30 nm. As can be understood also from the drawings, both the maximum transmittance and Δu'v' can be reduced by varying Rth's of the color filter layer. Among those, the region with Rth(R)=−30 nm, Rth(G)=10 nm, and Rth(B)=0 nm has the most favorable performance with Δu'v' of 0.13 or less and a maximum transmittance of 0.08%. In the case where the optical compensating members with the Nz coefficients in the above-mentioned ranges are used in a range where other values (such as the Re values of the optical compensating members 17 and 18 and the optical constant of the liquid crystal molecules) are appropriately adjusted, Δu'v' and the maximum transmittance can be reduced by setting Rth(B) to satisfy |Rth(B)|≦30 nm.

Example 10

Figure 39:
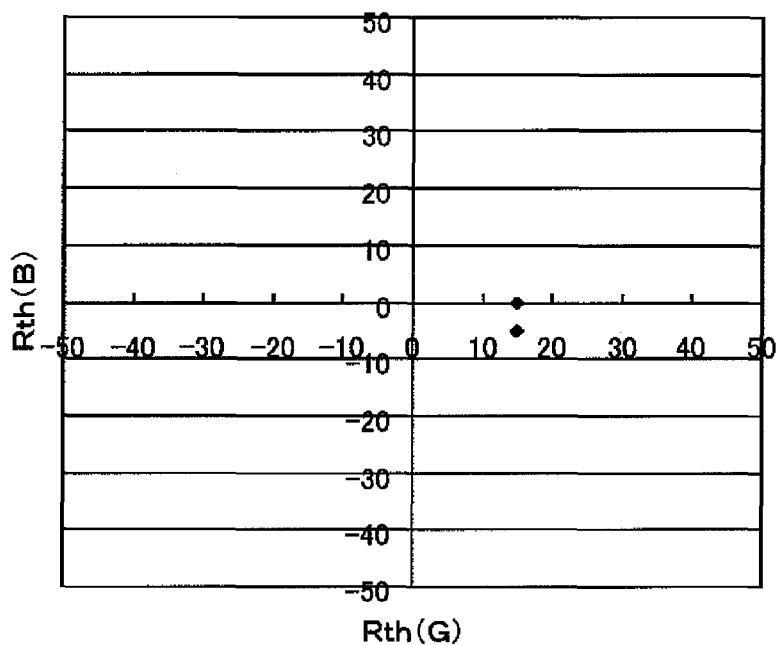
FIG. 39 is a characteristic diagram of an example of the liquid crystal display device of the present invention.

A structure of this example is illustrated in the left side of FIG. 1, and an optical configuration of e-mode is illustrated in FIG. 13. In this example, an optical compensating member with Nz1=−6 (Nz1<0.5) is used as the optical compensating member 17, and an optical compensating member with Nz2=0.7 (0.5<Nz2<1) is used as the optical compensating member 18. In the case where Rth's of the color filter layer are not considered (0 nm), the maximum transmittance becomes least at 0.13% with Δu'v' of 0.13 or less when Re of the optical compensating member 17 is 8 nm and Re of the optical compensating member 18 is 150 nm. In the case where the maximum transmittance is given priority, in contrast, Δu'v' is 0.15 and the maximum transmittance is 0.10% when Re of the optical compensating member 17 is 8 nm and Re of the optical compensating member 18 is 160 nm. Regions in which Δu'v' is 0.13 or less and the maximum transmittance is 0.13% or less with the optical compensating members fixed to the above-mentioned values and with Rth's of the color filter layer varied are indicated in FIG. 39. As one example, Rth(R) is set to −25 nm. As can be understood also from the drawings, both the maximum transmittance and Δu'v' can be reduced by varying Rth's of the color filter layer. Among those, the region with Rth(R)=−25 nm, Rth(G)=15 nm, and Rth(B) nm has the most favorable performance with Δu'v' of 0.13 or less and a maximum transmittance of 0.12%. In the case where the optical compensating members with the Nz coefficients in the above-mentioned ranges are used in a range where other values (such as the Re values of the optical compensating members 17 and 18 and the optical constant of the liquid crystal molecules) are appropriately adjusted, Δu'v' and the maximum transmittance can be reduced by setting Rth(B) to satisfy −25 nm≦Rth(B)≦0 nm.

Example 11

Figure 40:
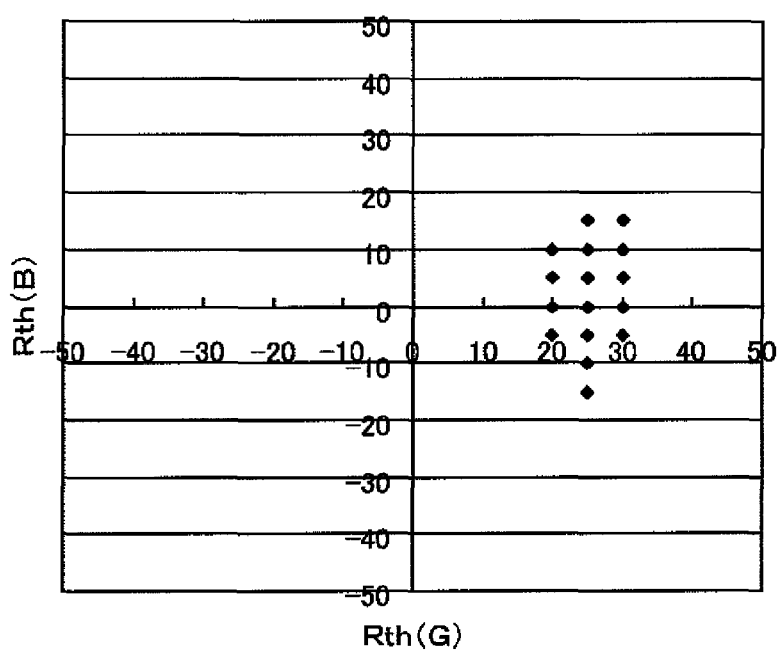
FIG. 40 is a characteristic diagram of an example of the liquid crystal display device of the present invention.

A structure of this example is illustrated in the right side of FIG. 1, and an optical configuration of o-mode is illustrated in FIG. 15. In this example, an optical compensating member with Nz1=−1 (Nz1<0.5) is used as the optical compensating member 17, and an optical compensating member with Nz2=1 (Nz2>0.5) is used as the optical compensating member 18. In the case where Rth's of the color filter layer are not considered (0 nm), the maximum transmittance becomes least at 0.22% with Δu'v' of 0.13 or less when Re of the optical compensating member 17 is 35 nm and Re of the optical compensating member 18 is 120 nm. In the case where the maximum transmittance is given priority, in contrast, Δu'v' is 0.17 and the maximum transmittance is 0.10% when Re of the optical compensating member 17 is 45 nm and Re of the optical compensating member 18 is 110 nm. Regions in which Δu'v' is 0.13 or less and the maximum transmittance is 0.22% or less with the optical compensating members fixed to the above-mentioned values and with Rth's of the color filter layer varied are indicated in FIG. 40. As one example, Rth(R) is set to −15 nm. As can be understood also from the drawings, both the maximum transmittance and Δu'v' can be reduced by varying Rth's of the color filter layer. Among those, the region with Rth(R)=−15 nm, Rth(G)=20 nm, and Rth(B)=10 nm has the most favorable performance with Δu'v' of 0.13 or less and a maximum transmittance of 0.13%. In the case where the optical compensating members with the Nz coefficients in the above-mentioned ranges are used in a range where other values (such as the Re values of the optical compensating member 17 and 18 and the optical constant of the liquid crystal molecules) are appropriately adjusted, Δu'v' and the maximum transmittance can be reduced by setting Rth(B) to satisfy |Rth(B)|≦30 nm.

Example 12

Figure 41:
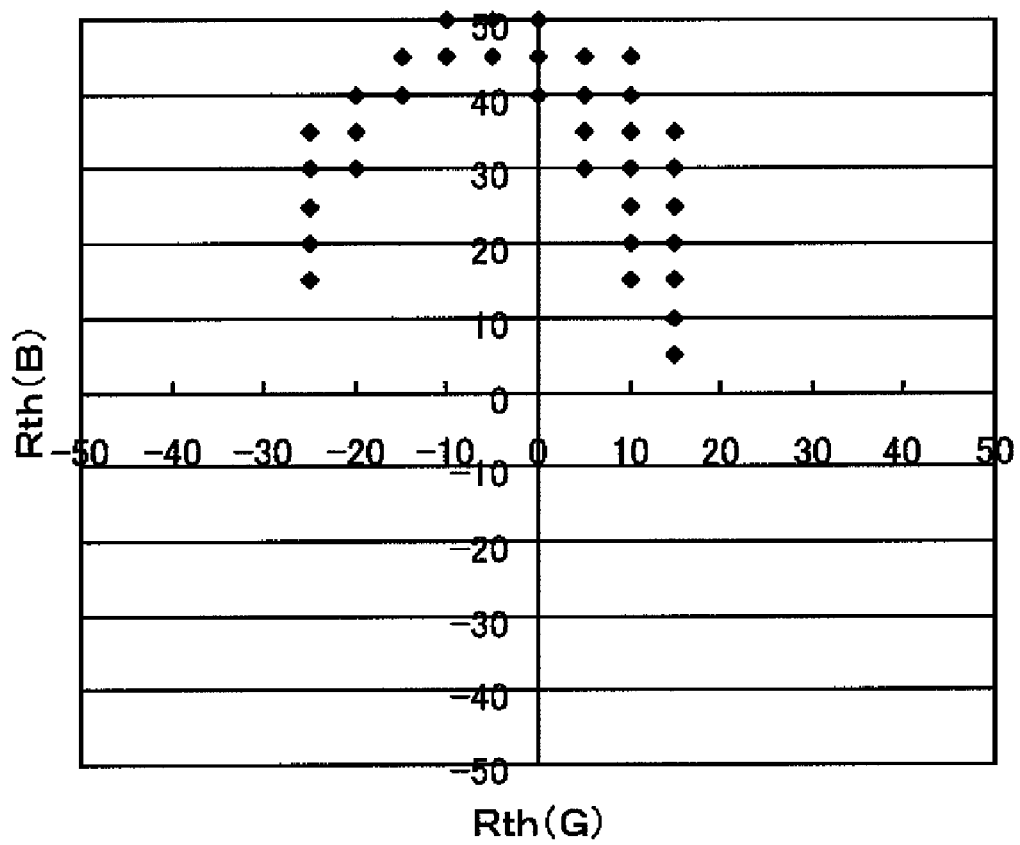
FIG. 41 is a characteristic diagram of an example of the liquid crystal display device of the present invention.

A schematic structure of this example is illustrated in the right side of FIG. 1, and a schematic optical configuration of o-mode is illustrated in FIG. 15. While the optical compensating members 17 and 18 are illustrated in the right side of FIG. 1 and FIG. 15, a single optical compensating member with Nz=0.5 (0.4<Nz<0.6) is used as the optical compensating member in this example. In the case where Rth's of the color filter layer are not considered (0 nm), the maximum transmittance becomes least at 0.11% with Δu'v' of 0.13 or less when Re of the optical compensating member is 250 nm. In the case where the maximum transmittance is given priority, in contrast, Δu'v' is 0.15 and the maximum transmittance is 0.10% when Re of the optical compensating member is 260 nm. Regions in which Δu'v' is 0.13 or less and the maximum transmittance is 0.11% or less with the optical compensating member fixed to the above-mentioned value and with Rth's of the color filter layer varied are indicated in FIG. 41. As one example, Rth(R) is set to −15 nm. As can be understood also from the drawings, both the maximum transmittance and Δu'v' can be reduced by varying Rth's of the color filter layer. Among those, the region with Rth(R)=−15 nm, Rth(G)=5 nm, and Rth(B)=30 nm has the most favorable performance with Δu'v' of 0.13 or less and a maximum transmittance of 0.06%. In the case where the optical compensating member with the Nz coefficient in the above-mentioned range is used in a range where other values (such as the Re value of the optical compensating member and the optical constant of the liquid crystal molecules) are appropriately adjusted, Δu'v' and the maximum transmittance can be reduced with 0 nm≦Rth(B)≦50 nm.

Also in the example 2 and the subsequent examples described above, Rth(R) takes a value similar to the value given in the example 1. Thus, thickness-direction retardations for red pixels and blue pixels are provided to reduce light leakage from red pixels and blue pixels, which balances blue light leakage and red light leakage to reduce coloring. For the thickness-direction retardation Rth(G) for green pixels in the examples described above, light leakage is reduced for 550 nm light because an optical compensating member or the like is provided to relatively eliminate the effect of the liquid crystal layer as described above. In consideration of balance with red and blue light leakage, however, Rth(G) desirably satisfies |Rth(G)|≦30 nm. In the case where a plurality of optical compensating members are used, it is difficult to reduce coloring by just adjusting Rth(R) and Rth(B). Therefore, Rth(G) is desirably in the range of 5 nm≦|Rth(G)|≦40 nm.

The present invention relates to a liquid crystal display, and particularly relates to an in-plane switching (IPS) mode liquid crystal display device in which liquid crystal molecules are homogeneously aligned during black display, and an electrical field is applied to the molecules in a lateral direction, to thereby control light transmittance and blockage. The present invention relates to significant improvement of the viewing-angle characteristics (particularly during black display and low-gradation display) of such a device, and is applicable to any IPS mode liquid crystal display device.

While there have been described what are at present considered to be certain embodiments of the invention, it is understood that various modifications may be made thereto, and it is intended that the appended claims cover all such modifications as fall within the true spirit and scope of the invention.

What is claimed is:

1. A liquid crystal display device, comprising:
a first substrate including a first polarizing layer on a light-input side;
a second substrate including a second polarizing layer on another side,
the first polarizing layer and the second polarizing layer having absorption axes substantially perpendicular to each other;
a liquid crystal layer in which a liquid crystal molecule is aligned so as to be substantially horizontal to the first substrate and the second substrate;
a matrix-drive electrode group having a pair of electrodes provided in each pixel on a side closer to the liquid crystal layer one of the first substrate and the second substrate;
a rear-surface illuminating device;
at least one optical compensating member; and
a color filter layer provided between the first substrate and the second substrate, wherein:
in a case where an absorption axis of the first polarizing layer and an optical axis of the liquid crystal layer are substantially perpendicular to each other,
the at least one optical compensating member is provided between the first polarizing layer and the liquid crystal layer, and
a refractive index between the second polarizing layer and the liquid crystal layer is substantially isotropic;
in a case where the absorption axis of the first polarizing layer and the optical axis of the liquid crystal layer are substantially parallel to each other,
the at least one optical compensating member is provided between the second polarizing layer and the liquid crystal layer, and
a refractive index between the first polarizing layer and the liquid crystal layer is substantially isotropic;
the absorption axis of the first polarizing layer and a slow axis of the at least one optical compensating member are substantially perpendicular to each other;
the color filter layer satisfies nx≈ny≠nz for each of red (R) pixels, green (G) pixels, and blue (B) pixels;
at least one of thickness-direction retardations Rth(R), Rth(G), and Rth(B) for the red (R) pixels, the green (G) pixels, and the blue (B) pixels is different from the thickness-direction retardations for the other pixels; and
Rth(R) for the red (R) pixels satisfies Rth(R)>0 nm.

2. A liquid crystal display device, comprising:
a first substrate including a first polarizing layer on a light-input side;
a second substrate including a second polarizing layer on another side,
the first polarizing layer and the second polarizing layer having absorption axes substantially perpendicular to each other;
a liquid crystal layer in which a liquid crystal molecule is aligned so as to be substantially horizontal to the first substrate and the second substrate;
a matrix-drive electrode group having a pair of electrodes provided in each pixel on a side closer to the liquid crystal layer of one of the first substrate and the second substrate;
a rear-surface illuminating device;
at least one optical compensating member; and
a color filter layer provided between the first substrate and the second substrate, wherein:
in a case where an absorption axis of the first polarizing layer and an optical axis of the liquid crystal layer are substantially perpendicular to each other,
the at least one optical compensating member is provided between the first polarizing layer and the liquid crystal layer, and
a refractive index between the second polarizing layer and the liquid crystal layer is substantially isotropic;

in a case where the absorption axis of the first polarizing layer and the optical axis of the liquid crystal layer are substantially parallel to each other,
the at least one optical compensating member is provided between the second polarizing layer and the liquid crystal layer, and
a refractive index between the first polarizing layer and the liquid crystal layer is substantially isotropic;
the absorption axis of the first polarizing layer and a slow axis of the at least one optical compensating member are substantially parallel to each other;
the color filter layer satisfies $nx \approx ny \neq nz$ for each of red (R) pixels, green (G) pixels, and blue (B) pixels;
at least one of thickness-direction retardations Rth(R), Rth(G), and Rth(B) for the red (R) pixels, the green (G) pixels, and the blue (B) pixels is different from the thickness-direction retardations for the other pixels; and
Rth(R) for the red (R) pixels satisfies $Rth(R) < 0$ nm.

3. The liquid crystal display device according to claim 1, wherein in the case where the absorption axis of the first polarizing layer and the optical axis of the liquid crystal layer are substantially perpendicular to each other,
the at least one optical compensating member provided between the first polarizing layer and the liquid crystal layer comprises one optical compensating member,
the one optical compensating member has an Nz coefficient Nz satisfying $0.4 < Nz < 0.6$, and
Rth(B) for the blue (B) pixels of the color filter layer satisfies $0 \text{ nm} < Rth(B) \leq 30 \text{ nm}$.

4. The liquid crystal display device according to claim 1, wherein in the case where the absorption axis of the first polarizing layer and the optical axis of the liquid crystal layer are substantially perpendicular to each other,
the at least one optical compensating member provided between the first polarizing layer and the liquid crystal layer comprises a first optical compensating member and a second optical compensating member in this order from a side of the first polarizing layer, the first optical compensating member has an Nz coefficient Nz1 satisfying $0.5 < Nz1 < 1$,
the second optical compensating member has an Nz coefficient Nz2 satisfying $Nz2 < 0.5$, and
Rth(B) for the blue (B) pixels of the color filter layer satisfies $|Rth(B)| \leq 30$ nm.

5. The liquid crystal display device according to claim 1, wherein in the case where the absorption axis of the first polarizing layer and the optical axis of the liquid crystal layer are substantially perpendicular to each other,
the at least one optical compensating member provided between the first polarizing layer and the liquid crystal layer comprises a first optical compensating member and a second optical compensating member in this order from a side of the first polarizing layer,
the first optical compensating member has an Nz coefficient Nz1 satisfying $Nz1 > 0.5$,
the second optical compensating member has an Nz coefficient Nz2 satisfying $0 < Nz2 < 0.5$, and
Rth(B) for the blue (B) pixels of the color filter layer satisfies $0 \text{ nm} < Rth(B) \leq 25 \text{ nm}$.

6. The liquid crystal display device according to claim 1, wherein in the case where the absorption axis of the first polarizing layer and the optical axis of the liquid crystal layer are substantially parallel to each other,
the at least one optical compensating member provided between the second polarizing layer and the liquid crystal layer comprises a first optical compensating member and a second optical compensating member in this order from a side of the liquid crystal layer,
the first optical compensating member has an Nz coefficient Nz1 satisfying $Nz1 > 0.5$,
the second optical compensating member has an Nz coefficient Nz2 satisfying $Nz2 < 0.5$, and
Rth(B) for the blue (B) pixels of the color filter layer satisfies $|Rth(B)| \leq 30$ nm.

7. The liquid crystal display device according to claim 1, wherein in the case where the absorption axis of the first polarizing layer and the optical axis of the liquid crystal layer are substantially parallel to each other,
the at least one optical compensating member provided between the second polarizing layer and the liquid crystal layer comprises one optical compensating member,
the one optical compensating member has an Nz coefficient Nz satisfying $0.4 < Nz < 0.6$, and
Rth(B) for the blue (B) pixels of the color filter layer satisfies $-50 \text{ nm} \leq Rth(B) \leq 0 \text{ nm}$.

8. The liquid crystal display device according to claim 1, wherein in the case where the absorption axis of the first polarizing layer and the optical axis of the liquid crystal layer are substantially perpendicular to each other,
the at least one optical compensating member provided between the first polarizing layer and the liquid crystal layer comprises a first optical compensating member and a second optical compensating member in this order from a side of the first polarizing layer,
the first optical compensating member has an Nz coefficient Nz1 satisfying $Nz1 \geq 1$,
the second optical compensating member has an Nz coefficient Nz2 satisfying $Nz2 \geq 0$, and
Rth(B) for the blue (B) pixels of the color filter layer satisfies $|Rth(B)| \leq 40$ nm.

9. The liquid crystal display device according to claim 2, wherein in the case where the absorption axis of the first polarizing layer and the optical axis of the liquid crystal layer are substantially perpendicular to each other,
the at least one optical compensating member provided between the first polarizing layer and the liquid crystal layer comprises one optical compensating member,
the one optical compensating member has an Nz coefficient Nz satisfying $0.4 < Nz < 0.6$, and
Rth(B) for the blue (B) pixels of the color filter layer satisfies $-30 \text{ nm} \leq Rth(B) \leq 0 \text{ nm}$.

10. The liquid crystal display device according to claim 2, wherein in the case where the absorption axis of the first polarizing layer and the optical axis of the liquid crystal layer are substantially perpendicular to each other,
the at least one optical compensating member provided between the first polarizing layer and the liquid crystal layer comprises a first optical compensating member and a second optical compensating member in this order from a side of the first polarizing layer,
the first optical compensating member has an Nz coefficient Nz1 satisfying $0 < Nz1 < 0.5$,
the second optical compensating member has an Nz coefficient Nz2 satisfying $Nz2 > 0.5$, and
Rth(B) for the blue (B) pixels of the color filter layer satisfies $|Rth(B)| \leq 30$ nm.

11. The liquid crystal display device according to claim 2, wherein in the case where the absorption axis of the first polarizing layer and the optical axis of the liquid crystal layer are substantially perpendicular to each other,
the at least one optical compensating member provided between the first polarizing layer and the liquid crystal layer comprises a first optical compensating member and a second optical compensating member in this order from a side of the first polarizing layer, the first optical compensating member has an Nz coefficient Nz1 satisfying Nz1<0.5, the second optical compensating member has an Nz coefficient Nz2 satisfying 0.5<Nz2<1, and Rth(B) for the blue (B) pixels of the color filter layer satisfies −25 nm≦Rth(B)≦0 nm.

12. The liquid crystal display device according to claim 2, wherein in the case where the absorption axis of the first polarizing layer and the optical axis of the liquid crystal layer are substantially parallel to each other, the at least one optical compensating member provided between the second polarizing layer and the liquid crystal layer comprises a first optical compensating member and a second optical compensating member in this order from a side of the liquid crystal layer, the first optical compensating member has an Nz coefficient Nz1 satisfying Nz1<0.5, the second optical compensating member has an Nz coefficient Nz2 satisfying Nz2>0.5, and Rth(B) for the blue (B) pixels of the color filter layer satisfies |Rth(B)|≦30 nm.

13. The liquid crystal display device according to claim 2, wherein in the case where the absorption axis of the first polarizing layer and the optical axis of the liquid crystal layer are substantially parallel to each other, the at least one optical compensating member provided between the second polarizing layer and the liquid crystal layer comprises one optical compensating member, the one optical compensating member has an Nz coefficient Nz satisfying 0.4<Nz<0.6, and Rth(B) for the blue (B) pixels of the color filter layer satisfies 0 nm≦Rth(B)≦50 nm.

14. The liquid crystal display device according to claim 2, wherein in the case where the absorption axis of the first polarizing layer and the optical axis of the liquid crystal layer are substantially perpendicular to each other, the at least one optical compensating member provided between the first polarizing layer and the liquid crystal layer comprises a first optical compensating member and a second optical compensating member in this order from a side of the first polarizing layer, the first optical compensating member has an Nz coefficient Nz1 satisfying Nz1≦0, the second optical compensating member has an Nz coefficient Nz2 satisfying Nz2≧1, and Rth(B) for the blue (B) pixels of the color filter layer satisfies |Rth(B)|≦40 nm.

15. The liquid crystal display device according to claim 1, wherein Rth(G) for the green (G) pixels of the color filter layer satisfies |Rth(G)|≦30 nm.

16. The liquid crystal display device according to claim 1, wherein Rth(G) for the green (G) pixels of the color filter layer satisfies 5 nm≦|Rth(G)|≦40 nm.

17. The liquid crystal display device according to claim 2, wherein Rth(G) for the green (G) pixels of the color filter layer satisfies |Rth(G)|≦30 nm.

18. The liquid crystal display device according to claim 2, wherein Rth(G) for the green (G) pixels of the color filter layer satisfies 5 nm≦|Rth(G)|≦40 nm.

* * * * *